ly Patent # [19] [11] Patent Number: 4,967,381
Lane et al. [45] Date of Patent: Oct. 30, 1990

[54] PROCESS CONTROL INTERFACE SYSTEM FOR MANAGING MEASUREMENT DATA

[75] Inventors: Leslie A. Lane, Santa Clara; Lynn V. Lybeck, Moss Beach; David S. Perloff, Sunnyvale; Shoji Kumagi, Santa Clara, all of Calif.

[73] Assignee: Prometrix Corporation, Santa Clara, Calif.

[21] Appl. No.: 375,898

[22] Filed: Jul. 6, 1989

Related U.S. Application Data

[60] Division of Ser. No. 50,925, May 15, 1987, Pat. No. 4,873,623, which is a continuation-in-part of Ser. No. 864,024, May 16, 1986, Pat. No. 4,805,089, which is a continuation-in-part of Ser. No. 729,153, Apr. 30, 1985, Pat. No. 4,679,137.

[51] Int. Cl.⁵ .......................................... G01R 23/16
[52] U.S. Cl. ............................. 364/551.01; 364/146; 364/188; 364/192; 364/487
[58] Field of Search ............... 364/200, 146, 188, 192, 364/550, 900, 551.01, 485, 486, 487

[56] References Cited

U.S. PATENT DOCUMENTS

| | | | |
|---|---|---|---|
| 4,072,851 | 2/1978 | Rose | 364/487 |
| 4,104,725 | 8/1978 | Rose et al. | 364/487 |
| 4,507,740 | 3/1985 | Star et al. | 364/487 |
| 4,663,704 | 5/1987 | Jones et al. | 364/188 |
| 4,679,137 | 7/1987 | Lane et al. | 364/200 X |
| 4,805,089 | 2/1989 | Lane et al. | 364/188 |
| 4,812,996 | 3/1989 | Stubbs | 364/487 |
| 4,823,283 | 4/1989 | Diehm et al. | 364/146 X |
| 4,835,700 | 5/1989 | Tanaka et al. | 364/192 X |
| 4,843,538 | 6/1989 | Lane et al. | 364/188 |
| 4,873,643 | 10/1989 | Powell et al. | 364/188 X |

Primary Examiner—Parshotam S. Lall
Assistant Examiner—Edward R. Cosimano
Attorney, Agent, or Firm—Flehr, Hohbach, Test, Albritton & Herbert

[57] ABSTRACT

A system and method for computer control of machine processes. The system and method provide a set of predefined data management or data analysis tasks which an operator of the system can use when using the system to run a selected process.

Measurement data structures for storing data measured during the running of processes, and related data, for a multiplicity of processes are defined and stored. Data is added to these data structures each time a process is run, and this data is automatically accessed when the operator requests data analysis on the data collected during previous uses of a selected process.

Access to measurement data for detailed data management tasks is provided graphically through the use of trend charts and statistical quality control charts. These charts depict trends in the measurement data for selected processes. By pointing at any data point in the chart, the user can access the corresponding record of data for detailed data analysis or for use in a data management task.

15 Claims, 27 Drawing Sheets

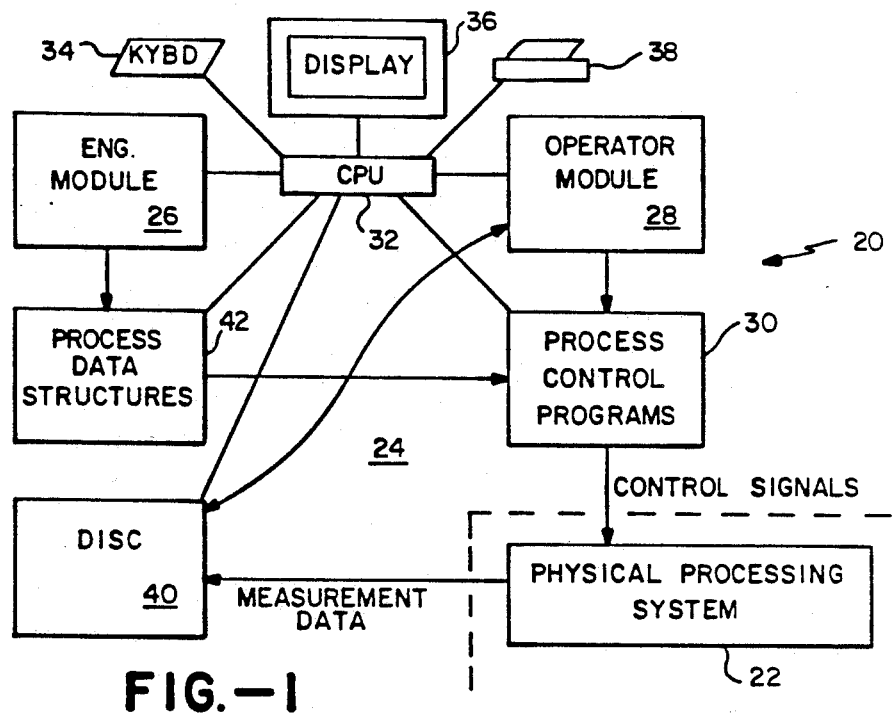
FIG.—1
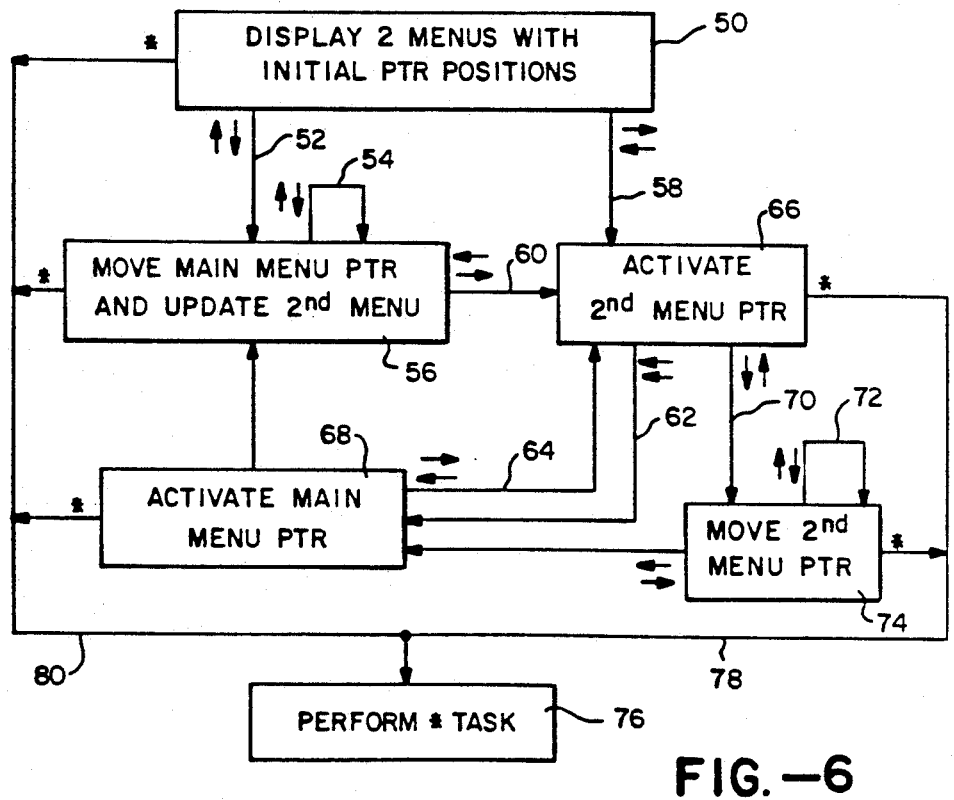
FIG.—6

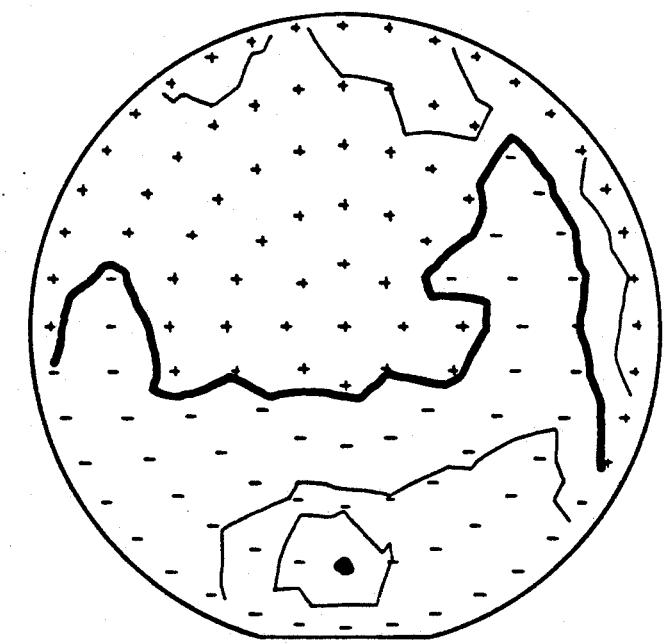
FIG.—2
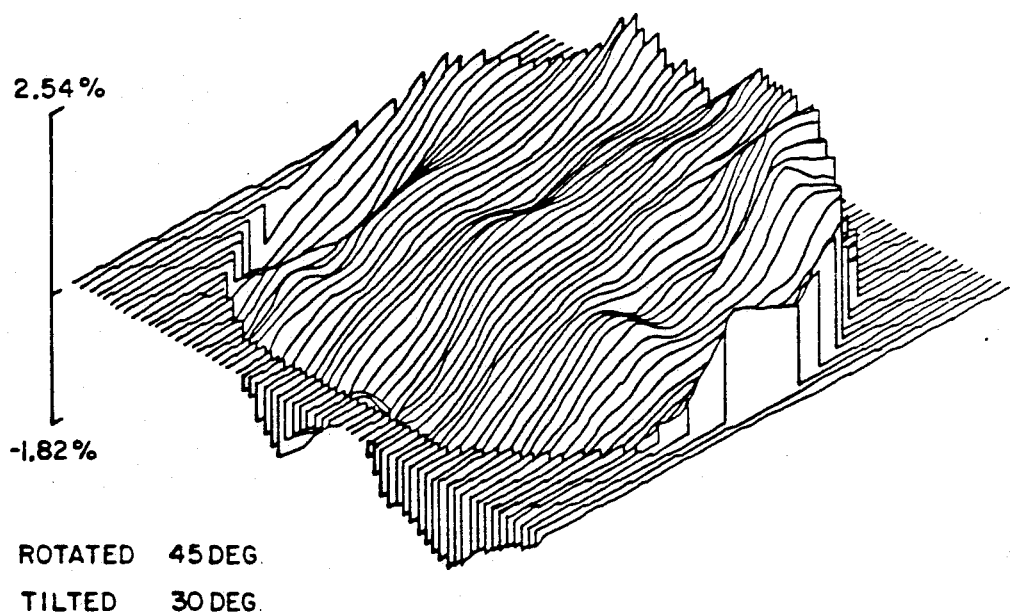
2.54%
−1.82%
ROTATED 45 DEG.
TILTED 30 DEG.
FIG.—3

| | QUICK TEST | | | RADIAL | THETA |
|---|---|---|---|---|---|
| 1 | ASTM-A | * | 1 | 1.000 | 0.0 |
| 2 | ASTM-B | | 2 | 0.000 | 0.0 |
| 3 | ASTM-C | | 3 | 1.000 | 180.0 |
| 4 | semi-A | | 4 | 1.000 | 90.0 |
| 5 | semi-B | | 5 | 0.000 | 90.0 |
| 6 | semi-C | | 6 | 1.000 | 270.0 |
| 7 | PROMETRIX 1 | | 7 | | |
| 8 | PROMETRIX 3 | | 8 | | |
| 9 | PROMETRIX 5 | | 9 | | |
| 10 | PROMETRIX 6 | | 10 | | |
| 11 | PROMETRIX 9 | | 11 | | |
| 12 | PROMETRIX 10 | | 12 | | |
| 13 | PROMETRIX RING 4 | | 13 | | |
| 14 | PROMETRIX RING 8 | | 14 | | |
| 15 | PROMETRIX STGGRD | | 15 | | |

[ ] [ ] [PAGE] [ ] [ ] [ ] [ ] [SELECT]

[ ] [ ] [PAGE] [ ] [UPDATE] [ ] [ ] [MAIN MENU]

| VARIABLE NAME | FORMAT | DESCRIPTION |
|---|---|---|
| QUICK_TYPE | CHAR (30X21) | NAME OF QUICK TEST TYPE |
| RADIAL | REAL (30X30) | RADIAL POSITION OF TEST SITES |
| THETA | REAL (30X30) | ANGULAR POSITION OF TEST SITES |

*FIGURE 9*

| | QUICK TEST | | | RADIAL | THETA |
|---|---|---|---|---|---|
| 16 | SPECIAL TEST #1 | | 1 | 0.000 | 0.0 |
| 17 | SPECIAL TEST #2 | | 2 | 1.000 | 0.0 |
| 18 | | | 3 | 1.000 | 90.0 |
| 19 | | | 4 | 1.000 | 180.0 |
| 20 | | | 5 | 1.000 | 270.0 |
| 21 | | | 6 | 2.000 | 0.0 |
| 22 | | | 7 | 2.000 | 90.0 |
| 23 | | | 8 | 2.000 | 180.0 |
| 24 | | | 9 | 2.000 | 270.0 |
| 25 | | | 10 | 3.000 | 0.0 |
| 26 | | | 11 | 3.000 | 90.0 |
| 27 | | | 12 | 3.000 | 180.0 |
| 28 | | | 13 | 3.000 | 270.0 |
| 29 | | | 14 | 4.000 | 0.0 |
| 30 | | | 15 | 4.000 | 90.0 |

| | | PAGE | | UPDATE | | | MAIN MENU |

*FIGURE 9a*

| | QUICK TEST | | | RADIAL | THETA |
|---|---|---|---|---|---|
| 16 | GSWs TEST #1 | | 16 | 4.000 | 180.0 |
| 17 | SPECIAL FOR DRP | | 17 | 4.000 | 270.0 |
| 18 | | | 18 | 5.000 | 0.0 |
| 19 | | | 19 | 5.000 | 90.0 |
| 20 | | | 20 | 5.000 | 180.0 |
| 21 | | | 21 | 5.000 | 270.0 |
| 22 | | | 22 | 1.500 | 45.0 |
| 23 | | | 23 | 1.500 | 135.0 |
| 24 | | | 24 | 1.500 | 225.0 |
| 25 | | | 25 | 1.500 | 315.0 |
| 26 | | | 26 | 2.500 | 45.0 |
| 27 | | | 27 | 2.500 | 135.0 |
| 28 | | | 28 | 2.500 | 225.0 |
| 29 | | | 29 | 2.500 | 315.0 |
| 30 | | | 30 | 3.500 | 45.0 |

| | | PAGE | | UPDATE | | | MAIN MENU |

*FIGURE 9b*

| | | 124 | 122 | 120 |
|---|---|---|---|---|
| A/NA | Name: Cabinet 1 | | | |
| A/NA | Name: Cabinet 2 | | | |
| A/NA | Name: Cabinet 3 | | | |
| | | | | |
| A/NA | Name: Cabinet 9 | | | |

Figure 11a

| | | 134 | 132 | 130 |
|---|---|---|---|---|
| A/NA | Name: Drawer 1 | | | |
| A/NA | Name: Drawer 2 | | | |
| A/NA | Name: Drawer 3 | | | |
| | | | | |
| A/NA | Name: Drawer 81 | | | |

Figure 11b

| | COLL. | COMB | 142 | 140 |
|---|---|---|---|---|
| A/NA | Y/N | Y/N | Name: Folder 1 | |
| A/NA | Y/N | Y/N | Name: Folder 2 | |
| A/NA | Y/N | Y/N | Name: Folder 3 | |
| | | | | |
| A/NA | Y/N | Y/N | Name: Folder 729 | |

| FILM NAME | FILM COMPONENTS (3) | SUBSTRATE | OP | 1 |
| FILM NAME | FILM COMPONENTS (3) | SUBSTRATE | OP | 1 |
| ... | ... | ... | ... | |
| FILM NAME | FILM COMPONENTS (3) | SUBSTRATE | OP | 10 |

| CAUCHY TEXT | CAUCHY VALUES (6) | 1 |
| CAUCHY TEXT | CAUCHY VALUES (6) | 2 |
| ... | ... | |
| CAUCHY TEXT | CAUCHY VALUES (6) | 20 |

| VARIABLE NAME | FORMAT | DESCRIPTION |
|---|---|---|
| FILM_NAME | CHAR (15X21) | NAME OF FILM SEQUENCE |
| FILM_OP | BIN (15) | FLAG DENOTING AVAILABILITY FOR USE 0=NOT AVAILABLE, 1=AVAILABLE |
| FILM_COMPONENT | CHAR (15X5X21) | FILM COMPONENT NAMES IN SEQUENCE |
| SUB_TYPE | CHAR (15X21) | NAME OF SUBSTRATE |
| CAUCHY_TEXT | CHAR (20X21) | CAUCHY FILM COMPONENT NAMES |
| CAUCHY_VALUES | REAL (20X6) | CAUCHY COEFFICIENTS |

*FIGURE 16*

SETUP READY FLAG
MASK FILE POINTER
(# FIELDS, # CHIPS/FIELD, # MODULES,
 # STRUCTURES IN MODULE A, # STRUCTURES IN MODULE B, ...)

| 0 | 1 | 1 | 1 | 1 | 0 |
|---|---|---|---|---|---|
| 0 | 1 | 1 | 1 | 1 | 0 |
| 0 | 1 | 1 | 1 | 1 | 0 |
| 0 | 1 | 1 | 1 | 1 | 0 |
| 0 | 1 | 1 | 1 | 1 | 0 |
| 0 | 0 | 0 | 0 | 0 | 0 |

FIELD SELECTION FLAGS

| 0 | 1 | 1 | 1 |
|---|---|---|---|
| 1 | 1 | 1 | 0 |
| 1 | 1 | 1 | 0 |
| 0 | 0 | 0 | 1 |

CHIP SELECTION PATTERN

MODULE SELECTION PATTERNS:

| 0 | 1 | 1 | 1 | 1 | 0 | 1 | 1 | 1 | 1 | 0 | MODULE A

| 1 | 1 | 1 | 0 | 1 | 1 | 1 | 1 | 0 | MODULE B

| 1 | 1 | 1 | 1 | 1 | 0 | 1 | 1 | 1 | 1 | 1 | 1 | 1 | MODULE C

| 0 | 0 | 0 | 0 | 0 | 0 | 0 | 0 | 0 | MODULE D

*FIGURE 20*

DEFINITIONS

| | | | |
|---|---|---|---|
| SMART CHART 1 | OPCODE | LIST OF TEST STRUCTURES | TARGET, LIMIT VALUES |
| SMART CHART 2 | OPCODE | LIST OF TEST STRUCTURES | TARGET, LIMIT VALUES |
| SMART CHART 3 | OPCODE | LIST OF TEST STRUCTURES | TARGET, LIMIT VALUES |
| ... | ... | ... | ... |
| SMART CHART 40 | OPCODE | LIST OF TEST STRUCTURES | TARGET, LIMIT VALUES |

DATA

| | CHART 1 | CHART 2 | | CHART 40 |
|---|---|---|---|---|
| RUN 1 | MEAN, STDV | MEAN, STDV | ... | |
| 2 | MEAN, STDV | MEAN, STDV | ... | |
| 3 | MEAN, STDV | MEAN, STDV | ... | |
| | ... | ... | ... | ... |

PROCESS CONTROL INTERFACE SYSTEM FOR MANAGING MEASUREMENT DATA

This application is a divisional continuation of application Ser. No. 07/050,925, filed May 15, 1987, now U.S. Pat. No. 4,873,623, entitled PROCESS CONTROL INTERFACE WITH SIMULTANEOUSLY DISPLAYED THREE LEVEL DYNAMIC MENU. Ser. No. 07/050,925 was a continuation in part of patent application Ser. No. 06/864,024, filed May 16, 1986, now U.S. Pat. No. 4,805,089, entitled PROCESS CONTROL INTERFACE FOR MANAGING MEASUREMENT DATA. Ser. No. 06/864,024 was a continuation in part of Ser. No. 06/729,153, filed Apr. 30, 1985, now U.S. Pat. No. 4,679,137, entitled PROCESS CONTROL INTERFACE SYSTEM FOR DESIGNER AND OPERATOR. Application Ser. Nos. 06/864,024 and 06/729,153 are both hereby incorporated herein in their entirety by reference.

TABLE OF CONTENTS
BACKGROUND OF THE INVENTION
SUMMARY OF THE INVENTION
BRIEF DESCRIPTION OF THE DRAWINGS
DESCRIPTION OF THE PREFERRED EMBODIMENTS
  Dynamic Menu Selection Method
  Operator Control Program
    Process Selection
    Parameter Entry
    Toggle and Edit Field Feature
    Running the Selected Process
    Data Analysis and Management Tasks
      Trend Charts
      SQC Charts
      Directory Listings
      Combined Process Data Analysis
  Data Structures
    Process Names and Availability Flags
    Parameter Formats and Data Structures
    Measurement Data Structures
    SQC Rule Subsets
  Engineering Set Up Control Program
    Task Selection
    Defining the Operator Prompts
    Test Definition
    Process Definition Duplication
    Quick Test Toggle/Edit Field Definition
  Overview of First Preferred Embodiment
  Alternate Embodiments
    Film Thickness Measurement System
    Multiparameter Measurement System
CLAIMS

TABLES

| TABLE # | Description | |
|---|---|---|
| 1-4 | Dynamic Menu - Folder Selection | |
| 5 | Table of Index Card Screens | |
| | Index Card Screens: | |
| 6 | Wafer Setup: | Wafer Facts |
| 7 | | Memos & Notes |
| 8a-b | Test Setup: | Test Type |
| 9 | | Current Setup |
| 10 | Test Results: | File Summary |
| 11 | | Data Summary |
| 12 | | Maps & Graphs |
| 13 | Trend Charts: | Chart Set-Up |
| 14 | | Chart Scaling |
| 15 | SQC Charts: | Chart Set-Up |
| 16 | | Chart Scaling |
| 17 | Directory Listing | |
| 18 | Parameter Data Structure for one Process | |
| 19 | Main Menu | |
| 20 | Engineer's Folder Selection Menu | |
| 21 | Film Type index card | |
| 22 | Mask Definition | |
| 23 | File Directory Format | |

This invention relates generally to systems and methods for computer control of machine processes and in particular to systems and methods for computer control which involve menu driven approaches to selection of processes including processes run by a machine and related data management processes.

BACKGROUND OF THE INVENTION

Database Management for Industrial Process Control

While many computer controlled machines are designed to automatically record data relevant to the performance of the machine, the analysis of this data is generally not automatic. This is especially true for machines which are used to perform a variety of different processes in an industrial environment. Furthermore, the operators who run such machines are rarely assigned to data analysis and database management tasks.

This combination of circumstances tends to cause the discovery of process control problems to be delayed until there is a noticeable degradation in the quality of the product being made or in the process being performed.

The present invention provides a system and method of database management that facilitates the performance of data management and analysis tasks by operators, rather than by the engineers who have normally performed such tasks in the past. In particular, the present invention employs the same easy to use menu driven selection method for selecting a process to be run and for requesting an analysis of the data collected from previous runs of the selected process. At the push of just a few buttons by the operator, the present invention automatically sorts through the measurement data stored in the system and performs a specified data management task, such as printing a trend chart for previously recorded data for the process specified by the operator.

As a result, the operator can initiate a data management task before or after running a selected process, using the same type of menus as he uses for selecting and running the selected process.

Sheet Resistance Mapping of Semiconductor Wafers

The invention described in this specification may be applied generally in computer controlled machines which perform various production or testing processes. It may also be applied to data collection and data base management programs. However, the detailed description of the invention will be given in terms of the control of an automated resistivity tester for performing sheet resistance mapping of semiconductor wafers. This equipment is used to characterize the performance of semiconductor wafer manufacturing equipment utilized to form surface layers of specific target conductivity value as part of the process of manufacturing semiconductor devices such as, for example, large scale integrated circuits.

The preferred version of an automated resistivity tester to be controlled by this invention is disclosed in copending and commonly assigned U.S. patent application Ser. No. 726,498, filed on Apr. 24, 1985, now U.S. Pat. No. 4,755,746 entitled "APPARATUS AND METHODS FOR SEMICONDUCTOR WAFER TESTING." Application 726,498 is incorporated herein by reference for background information regarding importance of performing automated resistivity testing on semiconductor wafers which have been subjected to ion implantation.

The correctness and uniformity of implant dosage across a semiconductor wafer can be determined in an automatic sheet resistance mapping system which has the capability of taking multiple test readings in both a contour map and diameter scan mode. From these tests and printouts, the engineer in charge of a process can determine whether the ion implantation equipment is operating properly.

To encourage the use of testing equipment such as automated resistivity testers, it is important to provide an overall computer control program for the tester which is easy for the engineer to set up to perform in-process monitoring measurements which will provide meaningful data. It is also important for the control program to be simple for the operator to run with confidence and consistency to produce meaningful data.

Engineer and operator convenience and confidence are the keys to increasing acceptance of automated process control and testing in all industries.

Prior Art Computer Control Methods

It has become a standard approach in the art to use a programmed digital computer to control the operation of various types of machinery which have the capability to perform a variety of tasks or the capability to perform the same task in a variety of ways.

Computer control of industrial machines generally involves a complex set of processes and a large number of parameters which must be entered for the machine to carry out a selected process. Because of this complexity, the set up of the machine for performing a desired process is usually done by an engineer who understands the overall functioning of the system and the interaction of the process parameters with the process control programs of the machine In the better designed systems, this engineering set up is facilitated by a machine control program which provides the engineer with a sequence of different menus or prompts which direct process selection and parameter entry. These menus or prompts are typically presented individually and in sequence. In situations requiring a substantial number of menu screens, process or parameter value choices on one screen may be affected by earlier or later choices several screens away. Thus the engineering set up operation may require continuous paging back and forth between screens to check on processes selected or parameters previously entered so that overall meaningful and consistent process selection and parameter entry can be achieved at each screen level.

The complexity and inconvenience of the engineering set up protocol of most computer controlled machines tends to discourage their use except by the more sophisticated engineers at the most sophisticated companies. Even when these systems are used, the requirement to provide written operator instructions introduces a frustration that tends to discourage widespread use of the technology to achieve the benefits it could produce.

SUMMARY OF THE INVENTION

In summary, the present invention is a system and method for computer control of machine processes. A dynamic menu feature is used in the selection of processes, data management tasks, and the definition and selection of operating parameters used by a process control program to direct the performance of the process by the machine.

The system and method of this invention incorporates the feature of providing a set of predefined data management or data analysis tasks which the operator of the system can use when using the system to run a selected process. The same type of menus used for selecting a process to run are used for initiating data management tasks.

Measurement data structures for storing data measured during the running of processes, and related data, for a multiplicity of processes are defined and stored. Data is added to these data structures each time a process is run, and this data is automatically accessed when the operator requests data analysis on the data collected during previous uses of a selected process.

Access to measurement data for detailed data management tasks is provided not only through the dynamic menu feature, but also graphically through the use of trend charts and statistical quality control charts. These charts depict trends in the measurement data for selected processes. By pointing at any data point in the chart, the user can access the corresponding record of data for detailed data analysis or for use in a data management task.

BRIEF DESCRIPTION OF THE DRAWINGS

Additional objects and features of the invention will be more readily apparent from the following detailed description and appended claims when taken in conjunction with the drawings, in which:

FIG. 1 is a block diagram of a process control system in accordance with the present invention.

FIG. 2 is a contour map and FIG. 3 is a three dimensional wafer resistivity map generated by a resistivity mapping program in the preferred embodiment.

FIG. 6 is a flow chart of the dynamic menu aspect of the present invention.

FIGS. 8a and 8b depicts the "index card" parameter entry screens as seen by operators, and engineers setting up a process, respectively.

FIGS. 9, 9a and 9b depict the screens and data structures used to define and select from a list of Quick Test types through the use of a toggle/edit field.

FIGS. 11a–11c depict the data structures used for defining process names in the preferred embodiment.

FIGS. 14–16 depict the displays and data structures associated with a two level edit field in a first alternate embodiment.

FIG. 20 depicts a test definition data structure.

FIG. 21 depicts a trend chart definition and data storage data structure.

FIGS. 24–26 depict displays used for setting up trend charts.

DESCRIPTION OF THE PREFERRED EMBODIMENTS

Figure 4:
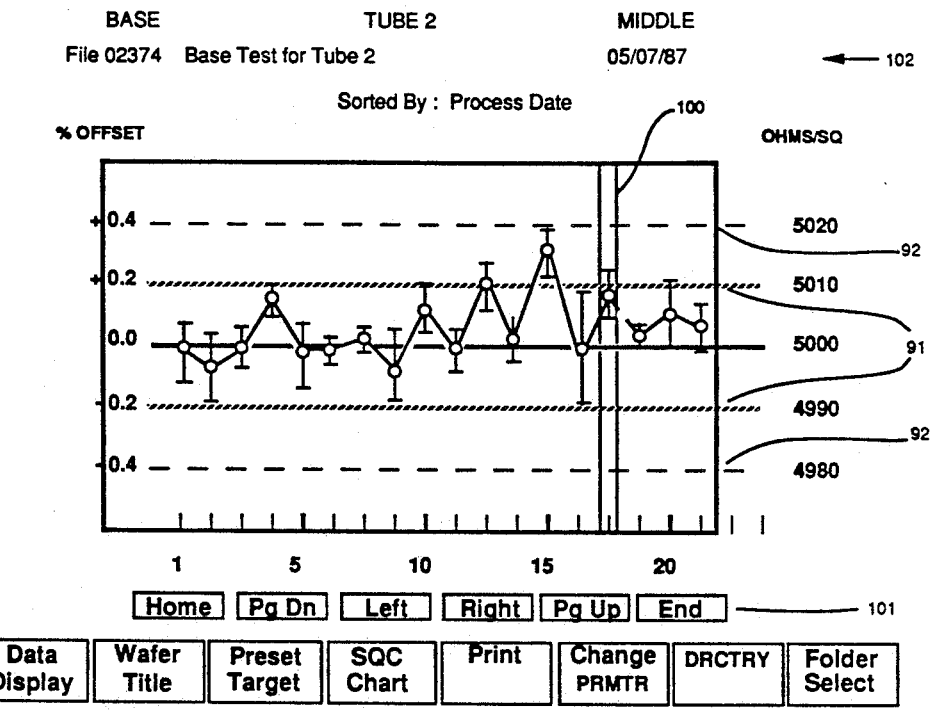
FIG. 4 depicts a trend chart generated by the preferred embodiment of the present invention.

The description below describes the present invention as used in three embodiments. As indicated above, the bulk of the description relates to the user interface for a semiconductor wafer resistivity tester The other two embodiments, which are discussed solely to show important additional features of the invention not used in the first embodiment, are a film thickness measurement system and a multiparameter lithography tester.

The film thickness system is discussed to show how complex parameters which incorporate several levels of information can be set up in a way that is both flexible for engineers and convenient for use by both the engineers and operators in a production environment. The multiparameter lithography tester is discussed to show how the features and advantages of the present invention can be applied to systems which need to measure and analyze numerous parameters (as opposed to the measurement of a single parameter, as in the resistivity and film thickness measurement systems) in a production environment.

Referring to FIG. 1, there is shown a block diagram of a system 20 incorporating the apparatus of this invention and capable of carrying out the method of this invention. A physical processing system 22, such as a semiconductor wafer resistivity tester, is controlled by a computer based control system 24. The control system 24, in accordance with this invention, includes an engineering set up module 26 and an operator module 28. The control system 24 further includes a set of process control programs 30, each of which is used to control the physical system 22 while it is performing a specified type of process.

The control system 24 includes a computer central process unit (CPU) 32, a keyboard 34 or equivalent device for entering commands and data into the system 24, a display device 36 such as a color monitor with a touch sensitive screen, and a printer 38. A removable 40 megabyte hard disc cartridge is used to store data structures 42 which define the process parameters used in the processes performed by the physical system 22; it is also used to store the measurement data generated by the physical system 22 during operation and measurement derived data generated by the CPU 32 such as mean values and standard deviations.

As will be explained in greater detail below (and as explained in copending application Ser. No., 729,153 now U.S. Pat. No. 4,679,137), the engineering module 26 is a set up control program (called the engineering set up control program) which is used by engineers to define the degree and types of restraints which limit and control the types of processes which can be run using the physical system 22. In the preferred embodiment, the computer used is a Hewlett Packard Vectra (an IBM PC/AT compatible computer).

The engineering module furthermore includes means for storing a representation of the set of decisions made by the person using the engineering set up program on a portable magnetic disc 40. These choices are represented by entries in a set of data structures 42 which are used by both the engineering set up and process control programs.

The operator module 28 is an operator process control program used by an operator (i.e., a person) to select and run processes on the physical system 22 which have been previously set up using the engineering set up module 26.

As will be described in greater detail below, the operator process control program 28 includes a process selection program for selecting which of the available processes is to be run on the physical system 22, a parameter entry program for specifying parametric values for use in conjunction with the process to be run by the physical system 22, and a data analysis or data management program for analyzing the measurement data collected by the control system 24 from the physical system 22.

In the preferred embodiment, the same computer can be used for engineering set up, process control, and data management. On the other hand, an engineer can use one computer to set up the processes he wants the operator to run, and can then hand the operator the disc 40 for use on a separate computer control system 24. Operators are denied access to the engineering module 26 by requiring knowledge of a password to use the engineering module 26.

In the preferred embodiment the physical system 22 is a wafer resistivity tester and there are three process control programs 30. One process control program, called Contour Map, causes the computer 36 in the operator module to send control signals to the tester 22 which direct it to measure and record the resistivity of a semiconductor wafer at a specified number of separate position coordinates on the wafer. Another process control program, called Diameter Scan, generates control commands which direct the tester 22 to measure and record the resistivity of a semiconductor wafer at a specified number of separate test sites along a diameter line. A third, called Quick Check, measures the resistivity at a small number of test sites to quickly determine the approximate resistivity of a semiconductor wafer.

Dynamic Menu Selection Method

The exemplary Folder Selection Menu display shown in Table 1 is used in the preferred embodiment to select one item from a set of items. The items are organized into groups and subgroups, each of which has an assigned name. For the purposes of this example, the items are resistivity test processes which can be performed by a resistivity tester 22 under the control of a computer 24.

Three menu display regions are defined on the display screen: a group menu, a subgroup menu, and an object menu. A fourth display region at the bottom of the display is used to identify the tasks which can be performed. Most of these tasks will use the items pointed to in the first three menu regions.

Conceptually, it is helpful to picture the items listed in the menus as a set of folders which are organized in drawers and cabinets In the preferred embodiment, each cabinet (i.e., each main menu item) contains up to nine drawers, and each drawer (i.e., each second menu item) contains up to nine folders. In other embodiments, the number of items under any menu could be unlimited, with the menus acting as windows which scroll up and down over the complete list of items in the menu.

There is a pointer associated with each menu region and also with the task selection region. The current position of each pointer is indicated by displaying the item in brighter video than the other items. An asterisk is used in Table 1 to identify the current pointer position, except for the active pointer, as explained below.

The subgroups shown in the second menu region are the subgroups which are associated with the group being pointed to in the first menu region. The items shown in the third menu are the items associated with the subgroup being pointed to in the second menu region.

Only one of the three position pointers is active at any one time The active pointer is shown by displaying the title of the corresponding menu in reverse video (shown in Table 1 with an asterisk "*" next to the word "CABINET") and by displaying the item being pointed to by the active pointer in bright reverse video (shown in Table 1 by an arrow pointing to the item in bright reverse video).

In the preferred embodiment, the display 36 is a touch sensitive display, and the keyboard 34 contains standard up, down, left and right cursor keys.

The active pointer can be moved either by using the keyboard's cursor keys or by touching the appropriate portion of the display's screen. The active pointer can be moved from one menu to another by using either the left and right cursor movement keys on the keyboard 34, or by touching the screen in the vicinity of the menu to which the user wants to activate the pointer. Similarly, the active pointer can be moved up and down the list of items in any one menu by using the up and down cursor keys, or by touching the screen in the vicinity of the item the user wants the active pointer to point to. In other embodiments of the invention, a mouse, light pen or other position indicator could be used as the pointer movement mechanism.

When the menus are first displayed, they begin with the active pointer pointing at the first group (i.e., Cabinet) name, and with the other pointers pointing to the first item in each menu, that is the Drawer and Folder menus.

As shown in Table 2, when the pointer in the cabinet menu region is moved, for instance, to point to the item labelled "EPI" in the menu, the drawer menu is automatically replaced with subgroup items associated with the group item being pointed to in the first (cabinet) menu region. Similarly, the third menu region is replaced with names associated with the new subgroup item being pointed to in the drawer menu display region.

Table 3 shows the display after the active pointer has been moved from its position in Table 2 to the second display region and has been moved down to the fifth item in the subgroup menu (labelled "REACTOR 1—SPECIAL"). Note that the items displayed in the folder menu have been automatically updated to correspond to the item being pointed at in the drawer menu.

Referring to Table 3, the tasks displayed in the "command line" along the bottom of the Folder Selection Menu are invoked by touching the appropriate box on the display screen. For example, touching the "COLLECT NEW DATA" box will cause the control system 24 to perform the resistivity measurement process corresponding to the item pointed to in the folder menu. If that process is a contour map process, the system 20 will measure the resistivity of a semiconductor wafer at a number of different points and will generate a resistivity contour map such as the maps shown in FIGS. 2 and 3.

Touching the "TREND CHART" box in Table 3 will cause the system to generate a trend chart showing the mean and standard deviation of the resistivity values during a preselected number of previous runs of the process pointed to in the folder menu. An example of such a control chart is shown in FIG. 4.

Figure 5:
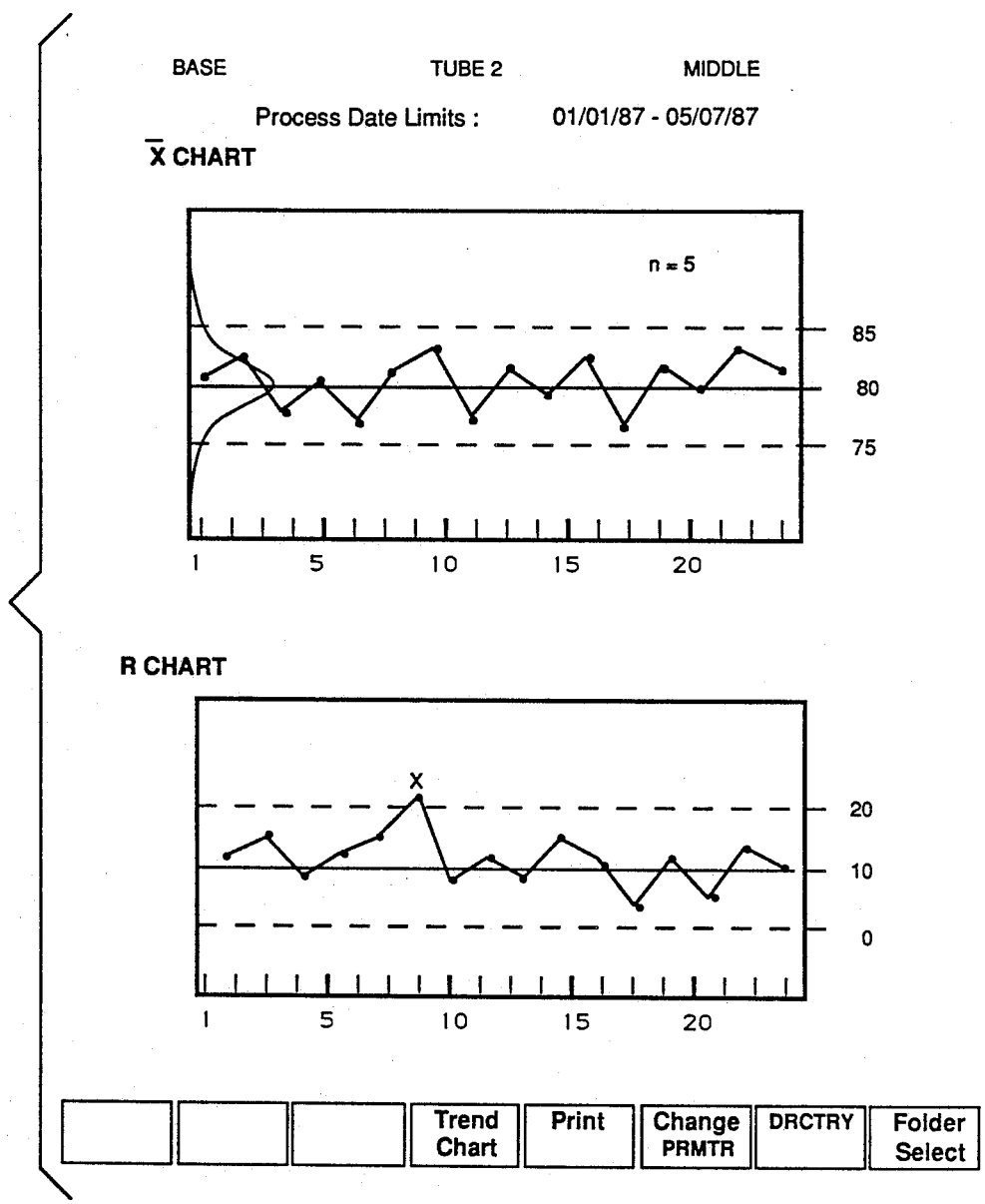
FIG. 5 depicts a statistical quality control chart generated by the preferred embodiment of the present invention.

An example of a statistical quality control (SQC) chart generated by the SQC CHART task is shown in FIG. 5.

Referring to FIG. 6, the basic menu selection method works as follows. First, at least two menu display regions are defined and two menus are displayed with predefined initial pointer positions (box 50). For instance, in the dynamic menu example shown in Table 1 there is a first menu display region entitled CABINET and a second menu display region entitled DRAWER. Each display region has a pointer, the position of which is indicated in Table 3 by an asterisk or arrow. The items being pointed at by the display region pointers are visually distinguished (e.g., by highlighting, use of bright video or use of reverse video) from the other items in the menus so that the user will know the current position of these pointers Up and down cursor keys (see process flow paths 52 and 54) are used to move the main menu pointer, which automatically causes the second menu to be replaced with items corresponding to the main menu item currently being pointed at (box 56). See for example the transition from Table 1 to Table 2. Process flow path 54 represents successive movements of the main menu pointer.

Successive uses of the left and right cursor keys (process flow paths 58–64) activate the second menu pointer (box 66) and then the main menu pointer (box 68). Each such movement of the active pointer from one menu display region to another is visually confirmed by highlighting the title of the display region with the active pointer In some, but not all, uses of the dynamic menu in the preferred embodiment the active pointer is further distinguished by showing the item being pointed at by active pointer in bright reverse video while the items being pointed at by the other display region pointers are shown in bright (but not reverse) video. The activation of the second menu pointer in Table 3 is shown by the movement of the asterisk from the title of the CABINET menu (in Table 2) to the title of the DRAWER menu (in Table 3). From the screen shown in Table 3, use of the left cursor would activate the first menu pointer and deactivate the second menu pointer.

When the second menu pointer is active, up and down cursor keys (process flow paths 70 and 72) are used to move the second menu pointer (box 74). Thus, the screen shown in Table 3 was achieved by activating the second menu pointer and then using the down cursor key four times to move the pointer down to the fifth item in the second menu display region.

At any time, a designated task can be performed (usually with reference to either the item pointed to by the active pointer or by the second menu pointer) by sending an appropriate signal to the computer (see box 76 and process flow paths 78 and 80). For instance, pressing the COLLECT NEW DATA box on the screen shown in Table 1 causes the system to use the process labelled BASE—TUBE 2—MIDDLE to collect resistivity data from a semiconductor wafer in the resistivity tester 22.

Operator Control Program

When the system 20 is first turned on, it displays the Introduction screen shown in Table 4 below. The Introduction screen identifies the system, displays a copyright notice and a warning concerning the proprietary rights in the system. The operator control program is loaded and started when the operator touches the FOLDER SELECT box on the command line at the bottom of the screen.

The SETUP command loads the Engineering Set Up program, which will be discussed below. The LOG ON DISK command is used for copying the process name and the test set up data structures from a new disk into the system's memory. The other commands at the bottom of the Introduction screen concern features not directly related to the operator control program.

The operator assigned to carry out some resistivity testing operations on one or more wafers has, in the preferred embodiment, an operator-related disc 40 on which an engineer has caused to be stored all of the parameter data structures for a multiplicity of processes. The operator inserts this disk in the system 20, and uses the LOG ON DISK command at the bottom of the Introduction screen, which causes the system to load the stored data structures from the disk into the internal memory of the computer.

Process Selection

After the operator touches the FOLDER SELECT box on the Introduction screen (see Table 4), the Folder Selection Menu in Table 1 is displayed on the touch screen. In the preferred embodiment, processes not available for use by the operator are simply not shown in the process selection (i.e., Folder Selection) menu.

For the purposes of this illustration, assume that the operator knows from the traveler, a process instruction sheet which accompanies the wafer(s) to be tested, which manufacturing process the wafer just underwent, which tube it was processed in, and whether the wafer was at the load end, middle or source of the tube. For this example we will assume the wafer just underwent an epitaxial deposition in the load end of Reactor 1 (i.e., a particular piece of semiconductor manufacturing equipment). As described above, the operator moves the menu pointers until the folder menu pointer points to the EPI —REACTOR 1—SPECIAL—LOAD END folder item (in Table 3).

Figure 7:
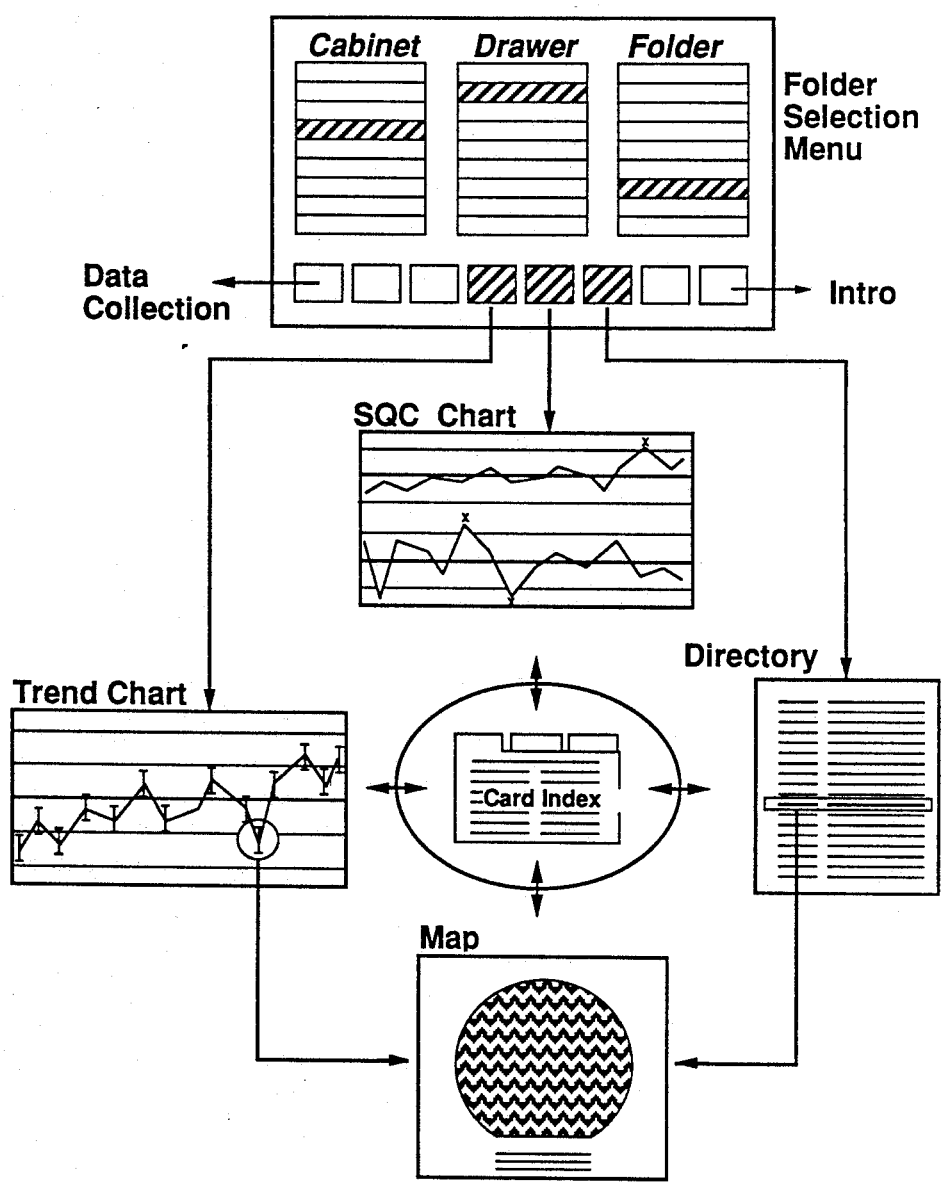
FIG. 7 is a conceptual flow chart of the data collection and analysis tasks performed by the present invention.

Referring to FIG. 7, there is shown a conceptual drawing of the tasks that can be performed by the operator and/or engineer by activating one of the labelled boxes in the command line of the Folder Selection Menu. The COLLECT DATA task initiates parameter entry for running the selected process; the TREND CHART task generates trend analyses such as the one shown in FIG. 4; the SQC CHART task generates mean/spread statistical analyses such as the one shown in FIG. 5; and the DIRECTORY task lists all the previously collected data for the selected process. As will be explained in more detail below, the operator and/or engineer can also move directly back and forth between the parameter entry environment and the data analysis tasks—so that the operator or engineer can quickly view the effect of varying the analysis parameters. For example, a single touch of the screen can be used to move from the Trend Chart Scaling screen to a display of the trend chart.

Parameter Entry

Figure 8A:
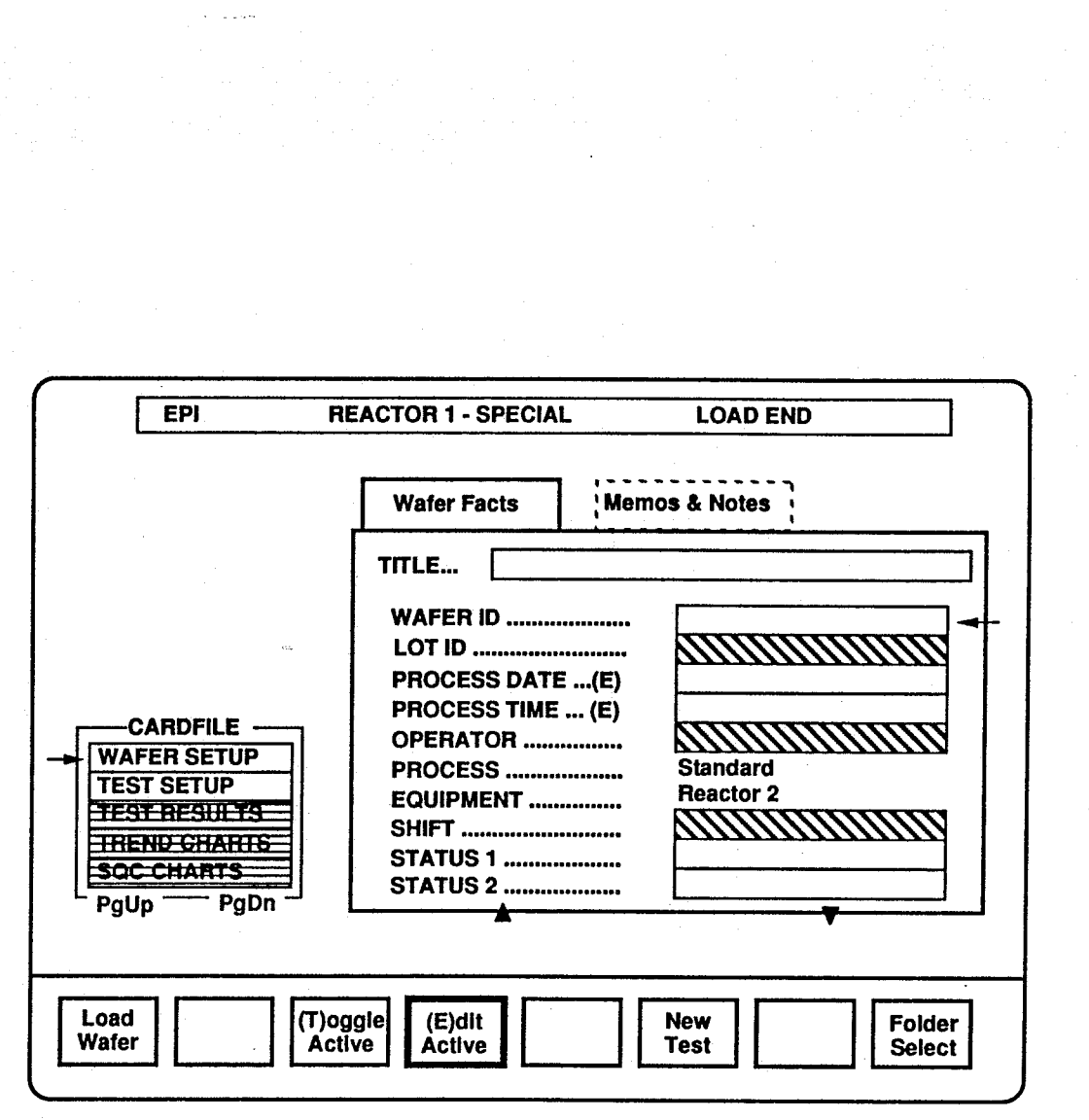

When the operator touches the "COLLECT DATA" box the system responds by displaying the screen shown in FIG. 8a.

As shown in FIG. 8a, at the initiation of parameter entry the system displays a table of contents listing the types of parameters to be entered, and the image of an index card showing the first set of parameters to be entered. The table of contents is actually a menu, entitled CARDFILE, for accessing a series of "cards"- which specify parameters for running the selected process and for displaying the data collected using this process.

Items in the CARDFILE which are currently not available for selection are not displayed; however, for the purposes of this description, they are shown in FIG. 8a with cross hatching. In FIG. 8a, the Test Results, Trend Charts and SQC Charts items are not available until the selected process has been run and data has been collected. Note, however, that the operator can access the Trend Chart and SQC Chart cards through the Folder Select Menu, as will be described in more detail below.

The tab on the top of the first card shown upon initiating parameter entry is labelled Wafer Facts. A second tab, labelled Memos & Notes, for the card "behind" the first card is also visible. The tab for the current card is distinguished from the other tab(s) by displaying the tab for the current card in brighter video than the others.

It should be noted that the display shown in FIG. 8A is actually a three level dynamic menu—and therefore functions in much the same way as the three level menu shown in Tables 1-4 for process selection. The CARDFILE index on the left is the top level menu, the line of tabs just above the cards is the second level menu, and the cards themselves are the third level menu. Thus, moving the cardfile pointer to a new item, such as Test Setup, will cause the second level menu (i.e., the tabs) to be automatically replaced with the corresponding second level items. Furthermore, the third level menu (i.e., the card) will be automatically replaced with items corresponding to a selected one of the index card tabs in the updated second menu—typically the first item in the second menu.

Tables 6 through 16 show all the index cards used in this three level dynamic menu in the first preferred embodiment as follows:

TABLE 5

| Index Card Screens Used by Operator and Engineer | | |
|---|---|---|
| Cardfile | Card Tab | Table |
| Wafer Setup | Wafer Facts | 6 |
|  | Memos & Notes | 7 |
| Test Setup | Test Type | 8 a–b |
|  | Current Setup | 9 |
| Test Results | File Summary | 10 |
|  | Data Summary | 11 |
|  | Maps & Graphs | 12 |
| Trend Charts | Trend Set-Up | 13 |
|  | Trend Scaling | 14 |
| SQC Charts | SQC Set-Up | 15 |
|  | SQC Scaling | 16 |

Figure 8B:
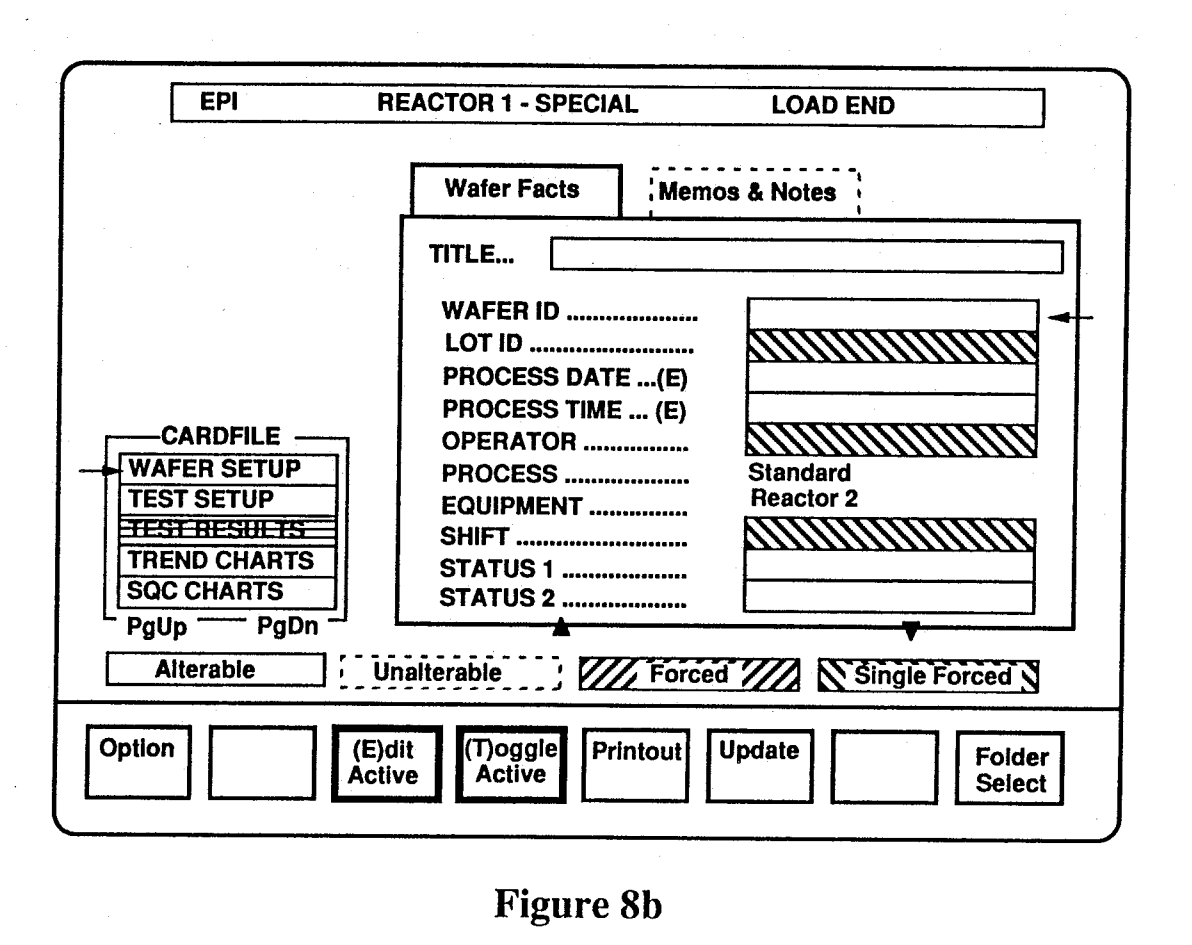

Note that Tables 6–16 do not show surrounding portions of the display, such as the folder identification line, and the cardfile index—as shown in FIGS. 8a–b.

Each of the screens or displays used by the operator for parameter entry and for controlling the display of test results includes a "folder identification line" at the top, which identifies the selected process, in this example EPI—REACTOR 1—SPECIAL—LOAD END. The identified process is the one which will be invoked when the selected process is actually run.

Each display shows the three level parameter menu (i.e., the CARDFILE index, the card tabs, and an index card). Also, all the cards associated with one particular execution of the selected process have the same "title line" at the top of the card. The title acts as a tag used to identify the data collected by this run of the selected process.

In the preferred embodiment, each parameter field is color coded to indicate whether the operator must or may enter a value for that field before running the selected process. As described below, since the figures in patents cannot be colored, the parameter fields in FIGS. 8a and 8b are distinguished to indicate the entry status of each parameter field as follows:

| Color Code | Figure Identifier | Parameter Type |
|---|---|---|
| Red | Single cross hatch | forced entry |
| Yellow | Double cross hatch | single time forced antry |
| Light Blue | Boxed w/o hatching | operator alterable |
| Black | unmarked | unalterable (fixed) |

For example, the LOT ID, OPERATOR and SHIFT parameters shown in FIG. 8a are "single time forced entry parameters" that the operator must enter a value for once each time the process is selected, but need not reenter if the selected process is used multiple times.

The portions of each parameter entry screen having "single time forced entry parameters" are colored yellow (designated in the Figures by double cross hatched rectangles).

Parameters, such as WAFER ID in FIG. 8a, which require entry of a value by the operator every time the process is used, called "forced entry parameters", are high-lighted with a red background, designated by single cross hatched rectangles in the Figures.

Parameters which are operator alterable, but not forced entry parameters, are highlighted with a blue background (designated by an unmarked rectangle in the Figures). Parameters with fixed values are shown in normal video with a black background (designated in the Figures by the absence of a box around these items).

In Tables 6–16, parameters which typically have fixed values are designated by the absence of a box around these items, and parameters which typically require or allow operator entry are designated with an unmarked rectangle. It should be understood these choices are only exemplary.

Thus the parameter entry screen is color coded to help the operator determine what information must be entered, and what information can optionally be entered, before the selected process is run.

It should be understood that some of the parameters, such as OPERATOR and SHIFT, are not process related parameters, but are data parameters which the engineer, in his discretion, has decided to track and thus to force the operator to enter before the process is run. Only process control parameters are used by the process control program to determine what commands are to be sent to the tester 22. Another type of parameter, called an analysis control parameter, is used to control the analysis performed by the process control program on the data collected while the process is run.

Parameters are entered simply by selecting a parameter field on the screen and then typing in a value. Selecting a parameter field is done by using the three level dynamic parameter entry menu (as explained above) to select an index card (i.e., a parameter entry screen), and then touching a parameter field on the screen. As explained above, ny item in a menu can be selected by touching it, or moving the screen pointer up or down until the proper parameter field is highlighted—indicating that it has been selected for entry.

When a parameter is entered, the color code for the parameter is changed to light blue, and the entry value is shown in bright yellow, to indicate that the operator has satisfied the entry requirement, but is free to revise the value entered. Thus the operator is visually cued as to which parameters have been entered or modified.

Referring to FIG. 8a and Tables 6–9, the four "index cards" (i.e., parameter entry screens) used for setting up a process run in the preferred embodiment are called Wafer Facts, Memos & Notes, Test Type, and Current Setup.

The index card screens shown in Tables 10–16 are used for displaying test results and for controlling the data analysis charts generated.

As will be discussed in more detail below, some fields, called toggle fields (identified by the letter "T"adjacent to the entry fields in the index card) are entered by "toggling" or cycling through a set of predefined choices Some other fields, called edit fields (identified by the letters "E/T" adjacent to the entry fields in the index card) can be selected by viewing a list of choices and selecting one of the displayed choices, or by toggling through the list of choices.

When the operator is done entering values on the screen shown in Table 6, he moves onto the next screen shown in Table 7 by touching the Memos & Notes tab above the index card, or by using the cursor movement keys to move the cursor to the right.

At any time while using the screens shown in Tables 6–9 the operator can abort the parameter entry process and return to the process selection screen shown in Table 3 by touching the Folder Select command box in the command line. Also, the operator can revise all parameter entries made, and can move back and forth through all of the parameter entry index cards, by running a test.

The New Test command is normally used to repeat a process, but can also be used by the operator to reset the status of the "forced entry" and "single forced entry" parameters—which leaves entered values unchanged, but reestablishes the color codes explained above—so that he can see which parameters required operator entry, without having to return to the Folder Select menu (Table 3).

Referring to Table 7, the operator may read a message for the engineer who set up the process, and may write a message to his supervisor or the set up engineer by selecting the MEMOS & NOTES card. Typically, the first four lines will be operator unalterable because these are a message to the operator. The last four lines, comprising a note to the operator's supervisor will typically be operator alterable—allowing, but not requiring, the operator to enter a message.

Referring to Table 8a, the card entitled TEST TYPE is used by the operator to provide values for several process parameters (TEST TYPE, TEST SITES, WAFER DIAMETER, TEST DIAMETER, SORT SIGMA and AUTO SAVE).

The engineer has previously denoted the TEST TYPE, WAFER DIAMETER and SORTING SIGMA parameters to be operator unalterable parameters, probably on the basis that the engineer has determined that he always wants 121 sites measured and the wafers will always be 100 millimeter wafers. The operator knows that they are fixed because they are displayed with a black background (designated in Table 8a by the absence of a rectangle around the unalterable items).

There is no need to allow the operator to alter these parameters and there is good reason not to have the operator enter these parameters at all since a mistake could be very costly in terms of improper test results which might allow wafers with improperly doped or improperly deposited epitaxial layers to undergo further processing without the problem being detected until after the circuits on the wafer were completed. In many prior art systems, the operator would have to enter these parameters from an instruction sheet, leaving the chance of an entry error. Here the engineer has fixed the parameter values as the correct ones to use.

As explained above, the operator alterable parameters are designated with an uncross-hatched rectangle in Tables 6-9, and the operator has discretion, within the instructions from the engineer, to alter these parameters in certain test situations. Another operator having a different disk with different data structures thereon may, for example, have different alterable parameters, either fewer or more.

Tables 8a and 8b show that the same basic index card will sometimes have a different set of parameters for different TEST TYPEs. When the test type is changed, the system automatically adjusts the format of the index cards in accordance with the selected test type.

The index card shown in Table 9, entitled Current Setup, is used to specify the method of adjusting the current asserted during testing, and also to specify typical amperage and voltage values.

Toggle and Edit Field Feature

If the engineer denotes the TEST SITES parameter as an operator alterable parameter, then one of the boxes on the command line will show the words TOGGLE ACTIVE whenever the operator selects this parameter for entry. The operator would then select a TEST SITES value from a predefined set of values by successively pushing the TOGGLE box on the command line until the desired value appeared in the TEST SITES field on the display.

Toggle fields in the preferred embodiment can be given values only from a predefined set. For each type of toggle field, such as TEST SITES and TEST TYPE, there is a separate set of available values. For instance, for a CONTOUR MAP test the set of toggle values for TEST SITES is: 49, 81, 121, 225, 361, 441, and 625.

Some toggle fields can be accessed both by toggling a "button" (i.e., a box on the command line of the display), or by viewing a list of values. Such parameters are herein called toggle/edit parameters. An example of a toggle/edit parameter is the QUICK TEST parameter shown in Table 8b. When a toggle/edit parameter is selected, two boxes on the command line are labelled TOGGLE ACTIVE and EDIT ACTIVE. The toggle box allows the user to sequentially move through the list of predefined values. Using the EDIT command, by touching the EDIT ACTIVE command box, causes the system to display a list of values, such as the list shown in FIG. 9.

The top portion of FIG. 9 shows a list of Quick Test types in the left menu. The operator selects one by moving the pointer in the left menu to an item, and then using the SELECT command. The selected Quick Test will then be shown in the Test Type card in Table 8b.

FIG. 9 contains some additional features. The two menus shown are a two level dynamic menu. The right menu displays the set of site locations corresponding to the currently selected item in the left menu. Each Quick Test can specify up to thirty test sites. Since there is only room for fifteen test sites in the menu, the PAGE command is used to toggle between the first fifteen and the last fifteen test sites. Also, the system can accommodate up to thirty different Quick Test types. Therefore, when the left menu has the active pointer, the PAGE command toggles between the first fifteen and the last fifteen items in the left menu.

The second command line shown in FIG. 9 is the command line used when running the Engineering Test Set Up program. These are the commands used to define new Quick Tests, and to save the revised Quick Tests on a disc.

The bottom portion of FIG. 9 shows the data structures used for storing the definition of the Quick Tests, and it is these data structures which are saved on a disc when the UPDATE command is used.

Other toggle/edit fields operate somewhat differently than the one shown in FIG. 9. However, the principle is the same: the toggle command moves the user through a sequence of choices, while the edit command provides a new display (or window on the display) which allows the user to view the set of options available to him.

Running the Selected Process

The box labelled "LOAD WAFER" on the command line in FIG. 8a can be used by the operator to initiate running the selected process once he has entered values for all the forced entry parameters in the screens shown in Tables 6-9. If the operator invokes LOAD WAFER before entering values for all the forced entry parameters, then the system displays the first one of the cards in Tables 6-9 which contains an unentered forced entry parameter. Thus the system will not allow a process to run until the operator enters values for all of the forced entry parameters.

The operator can move back and forth through the parameter entry screens and can change any of the alterable parameters, including forced entry parameters before invoking the selected process.

When all parameters have been entered, the operator touches the LOAD WAFER box in the command line and the process is run by the tester under computer control without further action by the operator. The operator will be prompted by the system to load a wafer on the wafer test platform of the system. After the operator confirms that a wafer has been placed on the wafer test platform, the tester system will take over and perform the process invoked by the operator. If the invoked process is a contour map process, the system will generate a contour map such as the one shown in FIG. 2, and the measurement data will be stored on the operator's disc 40.

When the tester is finished, the wafer platform will present the wafer back to the operator, and the system will display the DATA SUMMARY index card screen shown in Table 11.

From the test results screens (shown in Tables 10-12), the operator can invoke a large number of tasks related to the collected data, including tasks for generating Trend Charts, SQC Charts, and a Directory Listing. Also, at this point, all of the index cards for the currently selected folder (i.e., process), can be accessed —including all of the Test Results, Trend Charts, and SQC Charts cards. See Tables 10-16.

The File Summary card, shown in Table 10, shows only the file number for the data from the current test, the test type, number of test sites, mean, standard deviation, and the unit of measurement for the test.

The Maps & Graphs card, used only for Diameter Scan and Contour Map tests, and shown in Table 12, shows the range of data values measured, as well as data similar to that found in the File Summary card.

The TREND SETUP card shown in Table 13, and the TREND SCALING card shown in Table 14, control the generation of Trend charts (such as the one shown in FIG. 4).

The SQC SETUP and CHART SCALING cards, shown in Tables 15 and 16, control the generation of statistical quality control charts (see FIG. 5).

After the conclusion of a test, the operator can rerun the previously run test by touching NEW TEST command box, or can touch FOLDER SELECT to go back to the process selection menu to select another process.

If the operator uses NEW TEST, the parameter entry screen in FIG. 8a is displayed with all the parameter entries from the previous run left unchanged—except that the forced entry parameters will be color coded RED, to show that these parameters must be reentered before the process can be rerun. The parameters denoted as "single forced entry" need not be changed— entry of a value is forced only the first time the process is used. However, if the operator returns to the process selection screen (e.g., Table 4) before rerunning the process, the system will require entry of all forced (i.e., forced and single forced) parameters. After the operator has entered all the necessary parameter values in both parameter entry screens, the selected process can be rerun, as described above, by loading a new wafer onto the wafer platform and touching the LOAD WAFER box in the command line.

From this explanation, it will be appreciated that the operator control program is very easy for the operator to use with confidence. Process selection by the operator is greatly facilitated by the three level folder selection menu. Parameter selection is also facilitated by the three level index card menu. The system automatically communicates to the operator the status of each parameter for the selected process. Furthermore, with default values and fixed parameter values already entered, the operator has only to enter the forced entry parameters and make any changes in the operator alterable parameter values which the engineer has instructed or which the traveler accompanying the wafers to be tested signifies.

Data Analysis and Management Tasks

Referring to FIG. 7, the operator can initiate data analysis instead of data collection simply by touching one of the TREND CHART, SQC CHART or DIRECTORY command boxes instead of the COLLECT NEW DATA box. FIG. 7, is a conceptual drawing of the tasks which can be run from the Folder Selection Menu.

Generally, the operator can move freely from one analysis task to another. He can also view and modify the index cards which control the analysis, and he can select and view any of the individual data files associated with currently selected process (i.e., folder in the Folder Selection Menu).

Thus data analysis tasks can be performed either after data collection, starting with the DATA SUMMARY display, or from the Folder Selection menu.

TREND CHARTS

When the TREND CHART command is used the system 20 automatically generates a Trend Chart like the one shown in FIG. 4. Trend Charts show trends in the measurement data for a preselected number of previous uses of the selected process. The "selected process" is simply the process being pointed at in the Folder Selection Menu.

Typically, the Trend Chart is a chronologically ordered plot of the mean measured resistivity values and a three standard deviation range of the measurements about the mean value. However, the present invention allows the user to generate a number of different Trend Charts, by using the parameters in the Trend Chart index cards to specify the data to be plotted.

Viewing the trend chart on the system's display 36, the operator can easily determine if the measured resistivities are close to a specified target value or are moving away from the target. This makes it easy to see trends which might be hard to detect from inspection of the raw measurement data.

To help the operator interpret the Trend Chart, it is divided into zones: an inner zone which represents an acceptable range of data values; a middle zone above and below the inner zone, which represents a "warning" range of data values; and an outer zone above and below the middle zone, which represents unacceptable data values. Yellow warning lines 91 demark the beginning of the warning range, and red lines 92 demark the beginning of the out of "spec" range.

Referring to FIG. 4, the tasks on the Trend Chart command line 94 work as follows. DATA DISPLAY causes the system to display the data file(s) corresponding to the current position of the Retrieve Wafer pointer 100.

The Retrieve Wafer pointer 100, a vertical blue band which highlights one data point in the Trend Chart, provides a convenient visual tool for accessing data records in a database (and thus acts as a substitute for the traditional "query" instructions used by most database programs).

If the operator thinks a data point on the Trend Chart warrants further attention, he can move the Retrieve Wafer pointer 100 (using the touch screen buttons 101) until it points at the offending datum. The identity of the datum being pointed at by pointer 100 is displayed on prompt line 102. The DATA DISPLAY command causes the system to generate a listing or a plot of all the measurement data for the identified wafer. The type of listing or plot generated will depend on the type of process used to measure the data. If a contour map process was used, then a plot similar to the plots in either FIG. 2 or 3 will be generated.

The WAFER TITLE command is a toggle switch which selects the information to be displayed on the prompt line 102. Successive uses of the WAFER TITLE command cause the prompt line to show the file identifier, wafer title, mean and standard deviation, or the Status 1 and Status 2 fields (from the Wafer Facts index card) for the datum pointed at by the Retrieve Wafer pointer 100.

Trend Chart Set Up

The Trend Set-Up index card parameters shown in Table 13 select the data to be analyzed. The PLOT and DATA PTS ARE parameters determine the nature of the data points shown on the chart. Normally, when DATA PTS ARE is set to "INDIVIDUAL RDNGS", each data point represents the measurements performed on one wafer.

The Trend Chart typically shows up to sixty data points at a time, which might cover a period of only a few weeks. (Note that, if the selected data includes more than sixty data points, the Trend Chart display can be horizontally scrolled to show data points to the left and right of the current display through the use of the touch sceen buttons on line 101.) To generate longer term Trend Charts, the system can be instructed to combine measurements from multiple files so that each point on the Trend Chart represents the combined data from one day, one week, or one month. This done by setting the DATA PTS ARE parameter to DAY, WEEK, or MONTH.

Each such point represents the "average" value for the specified time period The average mean value for each chart point is computed simply by averaging the mean values of all the data sets represented by each point. The "average" range for each point in a mean and range chart is actually the extreme range values, both high and low, for all of the data sets represented by each point. The standard deviation corresponding to each average value is actually the computed standard deviation of the full set of relevant data.

The PLOT parameter specifies the data to be plotted as follows:

| PLOT | Description |
|---|---|
| mean-sigma | mean and distribution of data around the mean, as specified by the computed standard deviation multiplied by a parameter called the SIGMA BRACKET |
| mean-range | mean and maximum and minimum measurements |

The SEQUENCED BY parameter specifies whether the data is to be sequenced by collection date, process date, or wafer/lot identifier.

The USING parameters specifies whether the range of data measurements to be plotted is a date range, a lot identifier range, the last N wafers or the last N days.

The STARTING and ENDING parameters specify the beginning and end of a date range, which may be collection dates or process dates.

If USING is set to "last N wafers" or "last N days", then the Trend Set-Up card will display a parameter called COUNT instead of STARTING and ENDING. The COUNT parameter specifies the value of N, i.e., the number of wafers or days to be included in the Trend Chart.

The Trend Chart software in the preferred embodiment includes an autoscaling feature. The third box in the Trend Chart's command line 94 (labelled PRESET TARGET) is a toggle switch for switching between a preset scale if one has been defined by the engineer, and autoscaling.

Using the TREND SCALING card shown in Table 14, the engineer can provide specific plot limits, or he can specify that the plot limits be determined automatically by the system—in which case the third box in the command line 94 will be unlabeled and inoperative.

As will be understood by those skilled in the art, the engineer's preset scaling may overly compress or overly expand the Trend Chart, rendering it useless or difficult to use. Therefore, even if the engineer has specified a trend chart scale, the system allows the operator to select autoscaling if it becomes necessary to rescale the chart so that it ca be usefully interpreted.

Note that when the operator selects autoscaling, the engineer's specified limits are preserved so that the operator can toggle between the engineer's preset scaling and the autoscaling by successive uses of the third command box which is alternately labeled PRESET TARGET, and AUTO SCALE.

The Trend Scaling card, shown in Table 14, is used to specify the scaling of the vertical axis of the Trend Chart. The PLOT LIMITS parameter is set to USER DEFINED if the vertical axis is to be scaled using specified minimum and maximum values, or FULL SCALE if the vertical axis is to be automatically scaled by the system. If limits are specified, MIN and MAX parameters are shown in Table 14. If autoscaling is used, the Trend Chart is scaled so that all data points fall within the selected vertical axis. A third PLOT LIMITS option is called SPEC SCALE—in which case the Trend Chart is scaled in accordance with the SPEC value, as explained below.

The user can also specify TARGET, WARNING and SPEC values for the mean data value. The WARNING AND SPEC values can be specified either numerically, or as a percentage of the TARGET value. In either case, if these three values are specified, the plot will include horizontal lines including a line for the TARGET value, yellow lines 91 spaced from the target value by a distance equal to WARNING, and two red lines 92 spaced from the target values by a value equal to SPEC. Thus the user will be able to see immediately which data points are off target by the WARNING amount and by the SPEC amount. If the SPEC amount corresponds to a product specification, points outside the red SPEC lines will indicate defective products Similarly, if the STDV-WARNING and STDV-SPEC parameters are specified, then data points which have standard deviation larger than the specified WARNING percentage of the target value will be marked with yellow X's, and those with a standard deviation larger than the specified SPEC percentage of the target value will be marked with red X's.

The CORRELATION parameter specifies a function used to compensate for nonlinearities in the measuring equipment. A number of different correlation functions can be stored, and this parameter is used to specify the one to be used. The raw data is not changed; this function is used only to map the raw measured data into an adjusted set of data to be used for data analysis purposes.

SQC CHARTS

When the SQC CHART command is used, the system 20 automatically generates two statistical quality control charts like the ones shown in FIG. 5. The SQC charts show the mean and range for a sequence of items, each of which represents a cluster of data sets.

The range of a group of data values is defined as the difference between the maximum and minimum data values for items in each cluster of data sets.

Each data point on the SQC Charts typically represents somewhere between two and ten process runs. Since the results of each run of process is stored in a separate record called a file, each SQC point represents a summary of several data files. To put this in some perspective, if a selected process has been run two hundred times, and each SQC point represents a cluster of five runs, then the SQC Charts would each have forty points.

The symbol for the SQC mean is $\overline{X}$, and the symbol for the SQC range is R. Note that the SQC Chart shows the mean value and the range of a selected parameter from a cluster of data files. The selected parameter is the parameter being analyzed by the SQC task. Thus, if the selected parameter is the mean (measured) resistivity value, the SQC chart shows the mean of the mean resistivity values, and the range of the mean resistivity values. Similarly, if the selected parameter is the standard deviation of the measured resistivity values, then the SQC Chart will show the mean of the standard deviations, and the range of the standard deviations.

Figure 10:
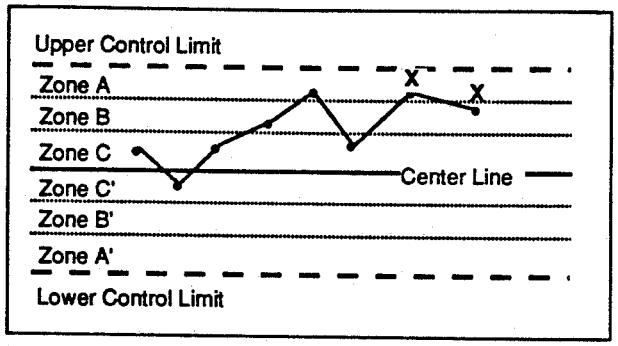
FIG. 10 depicts a typical set of rules or guidelines for determining the presence of a quality control problem, and a mechanism for defining different subsets of those rules to be applied in different circumstances.

Statistical quality charts have been in use for many years, and FIG. 10 shows typical rules or guidelines for determining the presence of a quality control problem. See Statistical Quality Control Handbook, 1956, Western Electric Co., Inc., Delmar Printing Company, which is hereby incorporated by reference as background information.

The top half of FIG. 10 shows that each control chart is divided into a series of zones. The center line of each chart represents the average value of a specified set of data. The control limits on each chart, which represent a range of plus and minus three standard deviations from the center line, are computed from the same set of data used to determine the center line.

Also, the spaces between the center line and the control limits are each divided into three zones, here labelled A, B and C. Thus, each zone has a width of one standard deviation as computed from a specified set of data. In many cases, the set of data used to determine the center line and control limits for the SQC charts will be the same as the data being analyzed. However, in some circumstances the set of data used to determine the center line and control limits (and the SQC zones) will not be the same as the data being analyzed.

For instance, the SQC center line and limits might be established in accordance with a set of data known to represent a reasonable range of process variation. Then the SQC analysis of recent measurement data would be performed using the "standardized" SQC center line and limits. More typically though, the set of data used to determine the center line and the control limits will be the same as the data being analyzed.

Actually, FIG. 10 shows a two level dynamic menu for defining rule sets. The rules shown in the right hand column comprise the full set of available rules. The left hand column are the names of several SQC rule subsets. When any one of the rule subsets is selected, by pointing at it with the left menu pointer, the right hand menu shows the rules which are included in that subset with a blue background, and showing the rules not included with a black background. (During engineering set up, the engineer toggles the status of each rule by using the OPTION command.) The SQC Set Up parameter called RULE SUBSET (shown in Table 15) specifies which rule subset is to be used when generating an SQC chart for the corresponding process.

The rules shown in FIG. 10 are applied by looking for single points beyond the control limits, and for series of points within certain specified zones. For instance, one point in zone A may be acceptable, but two points in a row in zone A may indicate a quality control problem.

Items which violate the specified rules are denoted with a marker, such as an X (colored red in the preferred embodiment) as shown in FIG. 5. Furthermore, the rules are applied separately to the $\overline{X}$ and R charts. The center line of the R chart is the average range value for the specified set of data point, and thus this chart has zones both above and below the center line as shown in FIG. 10.

The SQC Set-Up card, shown in Table 14, is used to specify parameter values which control the SQC Chart task. The PLOT parameter specifies whether the data to be analyzed is the mean of the measured values for each process run, the standard deviation of the measured values, or the range of the measured values.

The IN GROUPS OF parameter specifies the number of data sets to be included in each SQC group—i.e., to be represented as a single point on the SQC Chart. The SQC task allows anywhere from two to ten data sets to be grouped together, and typical values are three to six items per group. The data points in the $\overline{X}$ chart represent the mean of the grouped items, and the items in the R chart represent the range of the grouped items The SEQUENCED BY parameter specifies whether the data is to be sequenced by collection date, process date, or wafer/lot identifier.

The USING parameters specifies whether the range of data measurements to be plotted is a date range, a lot identifier range, the last N wafers, or the last N days.

The STARTING and ENDING parameters specify the beginning and end of a date range, which may be collection dates or process dates.

If USING is set to "last N wafers" or "last N days", then the Trend Set-Up card will display a parameter called COUNT instead of STARTING and ENDING. The COUNT parameter specifies the value of N, i.e., the number of wafers or days to be included in the Trend Chart.

The LIMITS ARE FOR parameter requires some background information. Referring to the top half of FIG. 10, the SQC task first sets up a center line, control limits, and a set of zones, each of which is one standard deviation wide. However, the data used for determining the value of the SQC center line and control limits need not be the same as the data analyzed in the SQC Chart. For instance, the user may know that a particular set of data files represents an acceptable range of variation in the process being monitored. The LIMITS ARE FOR parameter lets the engineer specify the set of data to be used for determining the SQC center line and control limits as shown in FIG. 10. Thus LIMITS ARE FOR can be set to SAME DATE RANGE (or SAME LOT/WAFER RANGE if the data is sequenced by lot/wafer id), or to DIFF. DATE RANGE (or DIFF. LOT/WAFER RANGE). If a different range is used for the SQC center line and control limit computation, then a separate LIMITS range is specified with STARTING and ENDING parameters. Otherwise, if the same range is used for both computing the SQC control limits and for quality control analysis, the display in Table 15 will not ask for a LIMITS definition.

Finally, the SQC SET-UP card has a parameter called RULE SUBSET, which specifies the rule set to be used for analyzing the selected data (see above discussion of FIG. 10).

The SQC Scaling card, shown in Table 16, is used to specify the scaling of the vertical axes of the $\overline{X}$ and R charts. The PLOT LIMITS parameter specifies whether the vertical axes are to be USER DEFINED, using specified minimum and maximum values, FULL SCALE, i.e., automatically scaled by the system, or 3-SIGMA SCALE—in which the minimum and maximum vertical axis values are three standard deviations below and above the center line of each chart. If PLOT LIMITS equals USER DEFINED, the SQC Scaling card is formatted to include MIN and MAX parameters—as shown in Table 14.

Referring to FIG. 5, the following commands are available to the operator when viewing an SQC Chart. First of all, the operator can print the SQC Chart using the PRINT command. Also, the operator can go directly back to the Folder Selection Menu (shown in Table 3 and FIG. 7) using the FOLDER SELECT command.

The CHANGE PRMTR command provides access to the SQC Set-Up and Scaling cards, shown in Tables 15 and 16. To the extent that the parameters shown in these cards have not been locked by the engineer who set up the process, the operator can change the parameters so as to change the analysis performed and/or the scaling of the charts. As shown in Table 15, the SQC Set-Up and Scaling screens include a command for returning to the SQC Chart display after the parameters have been reviewed and/or changed.

The operator can also move directly between data analysis tasks, using the TREND CHART command to switch over to the Trend Chart task, and the DRCTRY command to switch to the Directory Listing task (which is discussed below).

Using the present invention, operators with no prior training can generate SQC charts with the touch of a single button. Furthermore, those points which represent quality control problems are automatically marked (e.g., with a red X) so that the operator need not know anything about how to interpret these charts, except to look for the presence of a problem marker.

When the SQC chart indicates that a problem may exist, the operator can inform his supervisor so that further analysis of the data can be performed. Typically, an engineer will review the collected data to determine the source of the apparent problem. In a future embodiment, the system will allow the addition of an expert system and knowledge base to help the operator identify and solve problems associated with the process or equipment being monitored.

Automated quality analysis, as provided herein, can often lead to the detection of manufacturing quality control problems before the problem becomes severe enough to cause the production of defective products. The present invention is also convenient because it performs automatic quality control analysis using data which is also being collected for other purposes, and because the quality control analysis can be performed by the same machine which is used to collect the data—thereby eliminating the step of transporting the data to another machine, which is often sufficiently inconvenient that the analysis is performed only when a problem is severe enough to cause the production of defective products.

DIRECTORY LISTINGS

When using the Folder Selection Menu, the DIRECTORY LISTING command causes the system to display a list of all the files in which data is stored from previous runs of the selected process An example of the display generated is shown in Table 17.

Each file stores the data from a single run—i.e., the data representing measurements taken from a single wafer during a single run of the selected process. From this list the operator can choose a file for use in a subsequent task—such as generating an individual plot (e.g., a contour plot) of the data in the selected file.

The display shown in Table 17 includes a command, entitled BATCH PROC, for printing and transferring data files. The general purpose of the BATCH PROC task is to perform a specified operation on all members of a specified set of files.

As shown in Table 17a, using the BATCH PROC command causes a new set of commands to appear on the command line: SELECT, BATCH PRINT, HOST TRNSFR, FOLDER TRNSFR, and RETURN. The SELECT command is used to select and mark data files for "batch processing". The BATCH PRINT command causes all the marked data files to be printed; the HOST TRNSFR command sends copies of all the marked data files to host computer using a predefined transmission protocol; and the FOLDER TRNSFR command creates copies of all the marked data files in a specified Folder. The RETURN command returns the system to the regular Directory Listing display (Table 17).

COMBINED Process Data Analysis

Referring to FIG. 11c, the engineering set up program controls a flag on each folder called Combine On/Off. By enabling this flag in a folder, the engineer allows the data from two or more files (selected from any of the folders in the system) to be combined and stored as a new file in this folder. Of course, only compatible data files can be combined—meaning that all the files to be combined must have the same number of data points at that same wafer locations.

The COMBINE task can be performed by either an operator using the Operator Control Program, or by an engineer using the Engineering Set Up Program. When combining is enabled for a selected folder, one of the command buttons at the bottom of the Folder Selection Menu (see Tables 1-3) will be labelled COMBINE.

The purpose of combining files is to allow a specified data analysis task to be performed on the combined data. For instance, if two film thickness measurements were made at different points in an oxide formation process, a contour map of the difference between the two measurements would show the evenness of the newly formed oxide.

In the preferred embodiment, the user finds the file names of the files to be combined using the folder select menu (i.e., using the DIRECTORY command). Then, if combining is enabled, he uses the COMBINE command and enters a file combination specification such as:

02325-02326 to create a file representing the difference between the data in two files (i.e., files 02325 and 02326), or

00029+00031+00044 to create a file representing the sum of two or more files, or

AVE, 00021, 00022, 04143, 04445 to create a file representing the average of two or more files.

After the specified files have been combined, the File Summary card of the new, combined file is displayed (see Table 10). As described above, the user can then perform any of the standard analysis of this file, including the generation of a contour map if the combined data came from contour map processes, and even a trend analysis if the other files in the selected folder represent similar combined data.

Data Structures

In the preferred embodiment data structures are defined and stored for 729 (i.e., $9 \times 9 \times 9$) predefined processes which are organized into nine supergroups and eighty-one groups of processes, where each such group contains nine processes. These data structures are initially defined by the engineering set up module 26 (see FIG. 1) and then are stored on a disc 40 for later use. When the operator control module 28 is turned on, the parameter data structures (but not the measurement data structures) are copied into the computer's memory for use by the operator control module 28.

Process Names and Availability Flags

For each process, process group and process supergroup there is assigned a name and an availability flag. The names are simply the names that appear in the process selection menus, such as the menus shown in Table 1. The availability flag for each process and group determines whether the process or group is available for use by the operator. The engineer defining the processes to be used can use the availability flags to deny a specific operator (i.e., the users of a specific disc 40) access to the corresponding process, group or supergroup of processes. This is useful, for example, if a certain operator is authorized only to perform tests on certain types of wafers, or if a process has not yet been debugged but the engineer wants to use it on an experimental basis with only certain more highly trained personnel.

Referring to FIG. 11a, the SuperGroup Prompt data structure 120 contains a set of nine process supergroup names 122, each up to twenty characters long, and a set of nine corresponding group availability flags 124. The supergroup names 122 show up in the cabinet menu of the operator's process selection screen, as shown, for example, in Table 1 during the process selection step described above. Each supergroup availability flag is equal to 0 if the corresponding supergroup is available for use by the operator and is equal to 1 if the supergroup is not available.

Referring to FIG. 11b, the Group Prompt data structure 130 contains a set of eighty-one process supergroup names 132, each up to twenty characters long, and a set of eighty-one corresponding group availability flags 134. The first nine group names belong to the first supergroup, the next nine group names belong to the second supergroup, and so on. The group names 132 show up in the drawer menu of the operator's process selection screen, as shown, for example, in Table 1 during the process selection step described above. Each group availability flag is equal to 0 if the corresponding group is available for use by the operator and is equal to 1 if the group is not available.

Referring to FIG. 11c, the Process Prompt data structure 140 contains a set of 729 process names 142 and a set of corresponding process availability flags 144. The first nine process names belong to the first group, the next nine process names belong to the second group, and so on. The process names 142 for a selected group show up in the folder menu of the operator's process selection screen, as shown, for example, in Table 1 during the process selection step described above.

In the preferred embodiment, each process availability flag actually contains three flags: (1) an operator availability flag which is equal to 0 if the process is available for use by the operator and is equal to 1 if the process is not available; (2) a collection flag which is equal to 0 if data collection is allowed, and 1 if data collection is not allowed; and (3) a combine on/off flag which is equal to 1 if creating new data files in the corresponding folder by combining other data files is allowed, and 0 if data combining is not allowed.

If the process/operator availability flag is off, the folder's name does not even appear on the operator's Folder Selection Menu (Table 1). If the process is available, the COLLECT NEW DATA command is available only if the collection flag is enabled; similarly the COMBINE command is available only if the combine flag is enabled.

Parameter Formats and Data Structures

Figure 12:
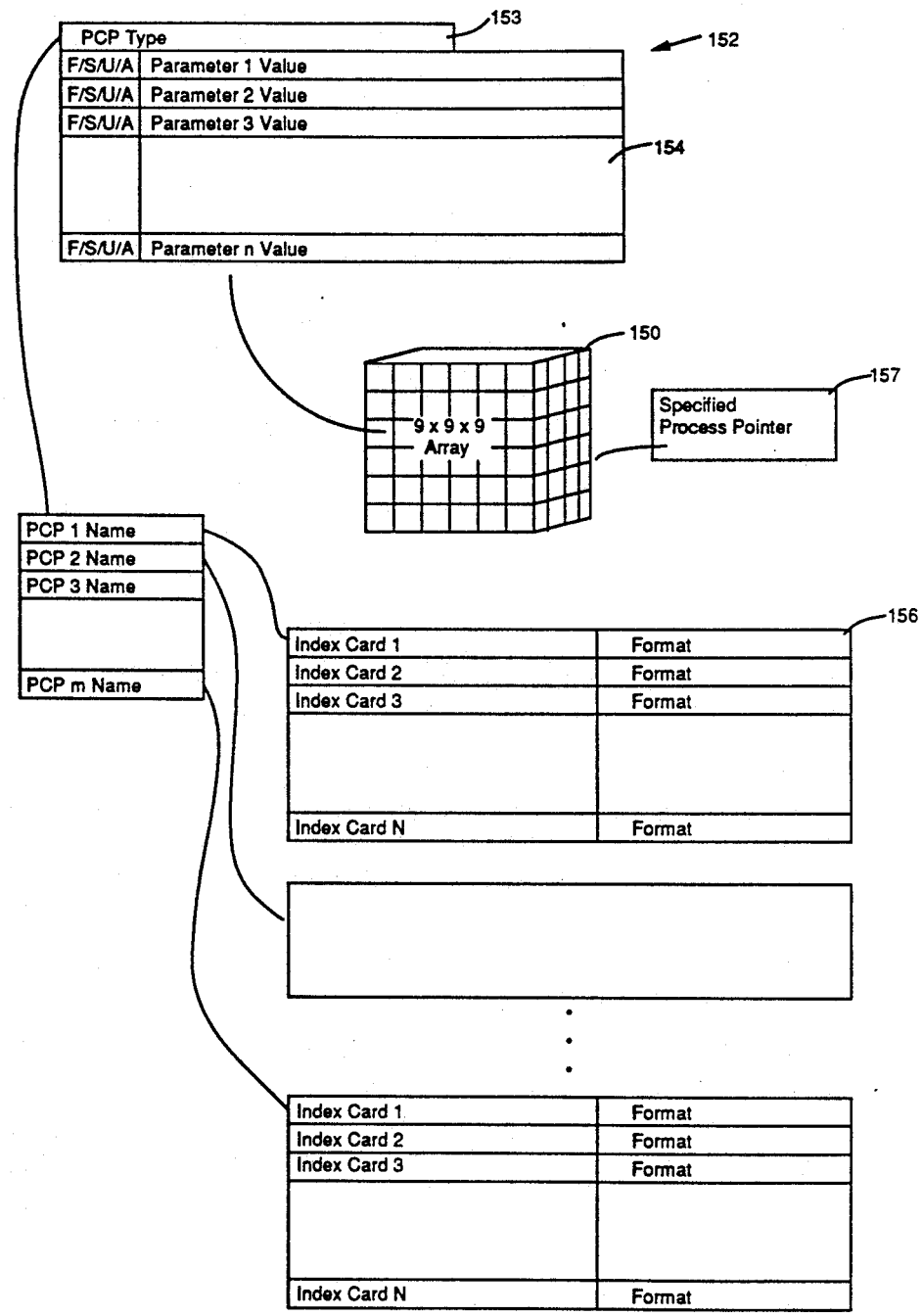
FIG. 12 depicts the data structures used for defining parameters in the preferred embodiment.

Referring to FIG. 12, the Parameter data structure 150 is used to store the parameter values for all the predefined processes. Conceptually, the Parameter data structure 150 comprises a $9 \times 9 \times 9$ array of process parameter data structures 152. Each process parameter data structure 152 contains an indicator 153 of the process control program associated with the process, and the default values 154, if any, of all the variable parameters associated with the corresponding folder.

Table 18 lists the variables included in the data structure 152 for defining each process. This data structure defines the process type, parameter default values, and operator control level for each parameter. Table 18 also shows the internal storage format of each parameter. The individual process control programs govern the display format of each parameter.

In the preferred embodiment, the same parameter data structure is used for every folder, regardless of the process control program selected. In addition, the process parameter data structure 152 includes all the variables needed for all the available processes. The advantage of this data structure is that (1) the data structure need not be replaced when the engineer selects a new process type, and (2) if the engineer is experimenting with two or more process types, the stored default values for each process are preserved when the engineer shifts between different process types. In other words, if the engineer first set up a particular folder for CONTOUR MAPPING, then changed his mind and began setting it up for a QUICK TEST, but then went back to CONTOUR MAPPING, the default values originally entered would not be lost.

As shown in Table 18, some of parameters are used by more than one of the available processes (e.g., all use a title parameter and all use WAFER ID, LOT ID, etc.) while others are used only for a particular process (e.g., Display_3D is used only to specify the rotation and tilt of the three dimensional maps generated by the Contour Map process)

Note that each named parameter in Table 18 has a corresponding entry in the OPTION array (the last item in parameter data structure) which denotes the operator control level for that parameter. Each entry (sometimes called a parameter status flag) in the OPTION array for a process set up parameter is equal to 0 if the parameter's status is FORCED (i.e., a forced entry parameter which must be given a value by the operator before the process can be run), 1 if the parameter's status is MAY CHANGE (i.e., changeable by the operator) parameter, 2 if the parameter's status is LOCKED (i.e., fixed in value), and 3 if the parameter's status is SINGLE FORCED (i.e., must be given a value the first time the process is used).

For the Trend and SQC Chart set up parameters, the parameter option or status flag is equal to 1 for parameters which may be changed, and 2 for parameters which are locked. Clearly, these parameters cannot be denoted as FORCED or SINGLE FORCED parameters because they are analysis control parameters.

Referring to FIG. 12, since each process control program will typically have different parameters associated with it, the format of the "index card" displays for each process control program is somewhat different. FIG. 12 depicts the data structure format 156 which specifies which of the parameters associated with each process are to be displayed on each of the "index card" displays—such as the ones shown in Tables 6–16.

In both the engineering set up process, and the operator control process there is a specified process pointer 157 which is used to point to the parameter and process name data structures of a specified process. This specified process is the process which is currently selected (i.e., specified) for being set up by the engineering set up process or for running by the operator control process.

Measurement Data Structures

Figure 13:
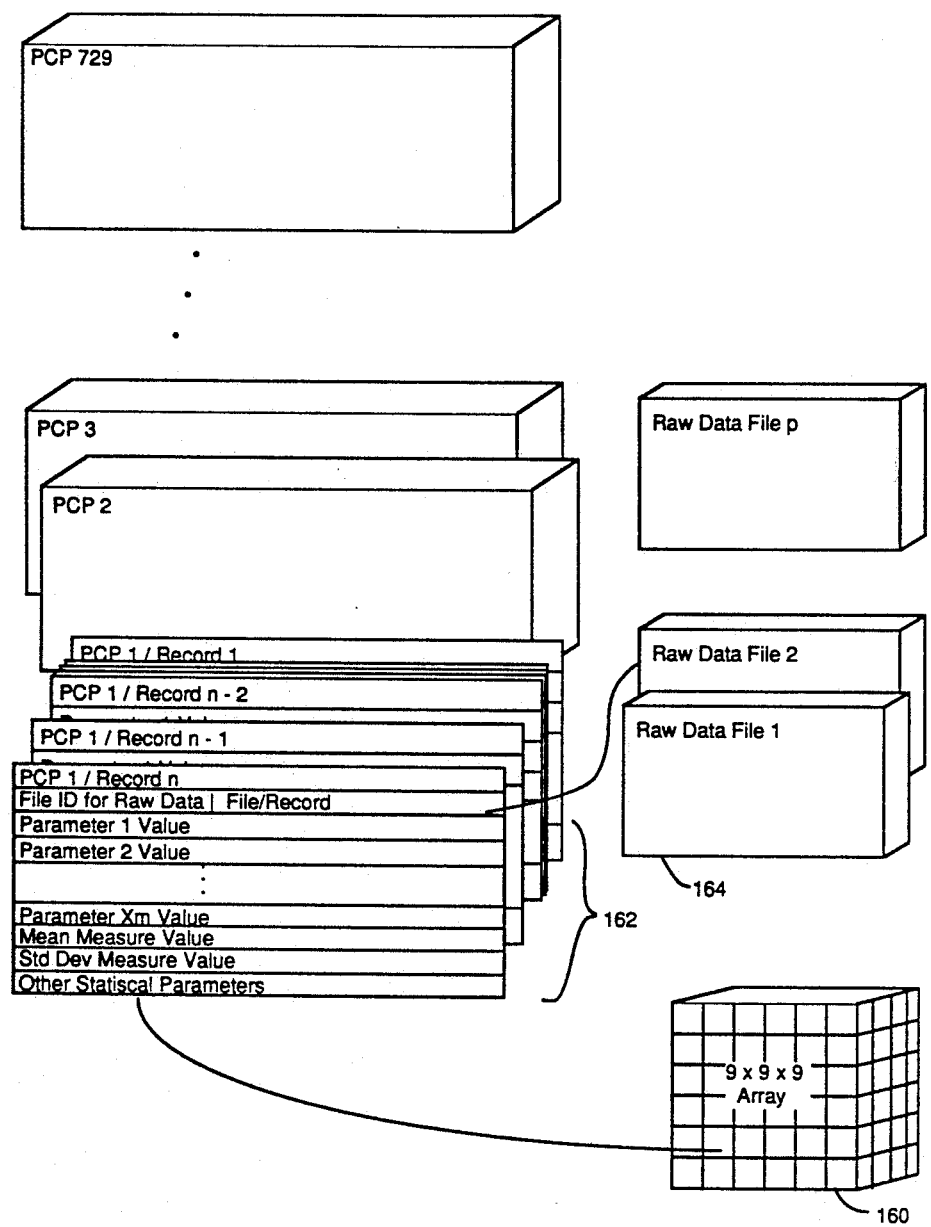
FIG. 13 depicts the data structures used for storing measurement data and related information.

Referring to FIG. 13, the Measurement data structure 160 is used to store the measurement values generated by each of the predefined processes. Conceptually, the Measurement data structure 160 comprises a 9×9×9 array of measurement data structures Actually, for each process there is one measurement file 162 and also a set of raw data records in another file 164. Both files contain one record for each data collection run performed using the corresponding process. Also, the records in the file 162 are kept in chronological order.

The records of the first file 162 contain the parameters used to set up and run the process (i.e., the parameter values entered by the operator and the engineer who set up the process), and data derived from the raw measurement values in file 164 including the mean resistivity value, the standard deviation of the measured values, and several other statistical parameters. Since each file 162 is associated with a particular process, and the number of parameters for the process is known, the system can directly access the statistical information at the end of each record (e.g., for generating trend charts and control charts) simply by indexing into each record to the appropriate depth.

Storage of the process definition parameters in the measurement data file 162 provides automatic documentation of the data, and allows detailed data analysis by the engineer using a data base management program.

Each record in file 162 also contains a file identifier which specifies the file and record in which the raw measurement data for the run is stored. In the preferred embodiment, the file identifiers are simply a set of sequentially increasing numbers (i.e, 00001, 00002, ...). Every time a file is created, the next sequential number is used as its name. Thus, even though each folder (i.e., process) has a separate set of files with increasing file numbers, the file numbers for any one process will not be sequential if the use of the different processes is interleaved.

In the preferred embodiment, there is a separate raw data file 164 for each data record length used. Thus the raw data for all processes which generate 121 data points (i.e., measure the resistivity of the wafer at 121 sites) are stored in one file 164, the raw data for all those which generate 225 points are stored in a second file 164, and so on. This scheme is used because it allows the use of fixed length record files, which provide fast access and are easier to set up than variable length record files.

SOC Rule Subsets

The data structure for storing the SQC rule subsets is as follows:

| Variable Name | Format | Description |
| --- | --- | --- |
| SQC_RULE_SET | Char(15 × 21) | Name of rule subset |
| SQC_RULE_OP | Bin(15 × 10) | 10 Flags for each rule subset, denoting selections from set of 10 SQC rules 1 = selected, 0 = not selected |

Engineering Set Up Control Program

The operation of the engineering set up control program to produce the configuration of the system discussed above will now be explained. When the engineer starts the system, he is presented with the same initial Introduction screen (shown in Table 4) as the operator. Access to the engineering set up control program is obtained by touching the SETUP box on the command line and then entering a predefined password. If a new operator related disc 40 is being introduced to the system, the parameter data structures stored on the disc 40 are loaded into the system memory by first using the LOG ON NEW DISK command.

The first screen presented on the touch screen by the Engineering Set Up Control program is shown in Table 19 and is called the MAIN MENU screen.

In accordance with the general use of color cues to aid use of the system 20, in the preferred embodiment the displays used in the engineering module have a yellow band around the outside edge of the display and use yellow as a background color for the command boxes at the bottom of the displays, while the displays for the operator module use a green border and a green background color. This helps the engineer setting up the system to know which module 26 or 28 he is currently using.

Task Selection

The MAIN MENU (Table 19) uses the dynamic menu feature of this invention as described above. This screen has two menu display regions in the central area of the display where main menu items and subsidiary menu items are displayed using the dynamic menu display feature of this invention. The subsidiary menu items shown in the right hand region correspond to engineering set up tasks which are part of the group of tasks designated TEST DEVELOPMENT since that is the main menu item being pointed to at this time.

The command line includes an INTRO command for returning to the Introduction display, a LOG ON NEW DISK command for copying the process definition data structures from a disc 40 into the computer's memory, a FOLDER SELECT command for selecting a Folder and viewing its process parameters and data, and a SELECT command for selecting and invoking the task currently being pointed to in the subsidiary menu of the Main Menu.

The DIRECTORY OPS group of tasks is a comprehensive set of data editing and data manipulation routines which allow the engineer to copy and move process definitions from one folder to another, and also to copy and move measurement data from on folder to another.

The SYSTEM CONFIGURATION group of tasks are used for defining the password that allows access to the engineering setup module, the system date and time, a system identifier, and several other similar functions.

The CARTRIDGE OPS group of tasks are used for formatting and initializing new operator discs, and for copying a set of process definition data structures onto an operator related disc.

The TEST DEVELOPMENT group of engineering tasks is the most important one and will be described in detail. To initiate the performance of this group of tasks, the engineer points to the TEST SET UP entry in the Item menu and touches the SELECT command box. The system responds by presenting the screen shown in Table 20.

If the engineer is starting with a blank disc, the Folder Selection Menu will be blank except for one initial exemplary folder setup. If the engineer has logged in a disc which already has been set up, the defined Cabinet, Drawer and Folder names will be displayed. The CABINET, DRAWER, and FOLDER areas are designated for supergroup, group, and process names or titles, respectfully.

Defining the Operator Prompts

Using the dynamic menu feature described above, the engineer moves the active pointer to any item in the menus which he wants to change. These items are changed as follows. New names are entered simply by pointing to the item, touching the SELECT command box, and typing in a new name on the keyboard, followed by a carriage return to mark the end of the new name. The OPTION box is used to toggle the item's status from available to not available and back. Not available items are displayed with a black background, and available items are displayed in reverse video (not shown in Table 20). When the operator uses the disc which the engineer has set up, processes and groups which are not available simply do not appear on the operator's display. Of course, if a process group is disabled, all of the individual processes in the group are automatically disabled since the operator cannot select any of the processes in that group.

All changes made by the engineer to the Folder Selection screen (Table 20) are reflected in the process name data structures 120, 130 and 140 as described above with reference to FIGS. 11a-c.

The COMBINE ON/OFF command box is used to toggle a folder's Combine On/Off flag off and on. When the folder currently being pointed at has its Combine flag set to ON, the command line will have a box labelled COMBINE OFF for turning off its Combine flag. Similarly, if the folder's Combine flag is OFF, the command line will have a box labelled COMBINE ON for turning on its Combine flag. In most systems, only a few folders will have an enabled Combine flag—because analyzing combined data requires more sophistication than most of the other analyses performed by the system.

The COLLECT ON/OFF commands work the same way as the COMBINE ON/OFF commands—they toggle the Collect flag's status and thereby enable and disable the collection of new data by the currently selected folder/process.

The UPDATE command is used to save the current status of the process name data structures, and also the parameter data structures 150 onto a disc 40.

If the engineer has preplanned the names of all the groups and processes, the screen in Table 20 can be edited by entering all of the group and process names at one time. Later these can be added to, deleted or changed at will. As explained above, in the preferred embodiment the engineer can define up to 729 processes, organized into 81 groups and 9 supergroups.

The UPDATE box is used to store the revised process name data structure onto the disc 40.

Touching the MAIN MENU box returns the engineer to the main menu screen shown in Table 19.

The SELECT box is used to initiate the process of defining or revising the process pointed to in the folder menu.

Test Definition

Once a process or test name (i.e., folder name) has been defined, the next task is to define the process. To do this the engineer touches the SELECT box in the screen shown in Table 20.

The engineering set up control program uses virtually the same index card screens as used by the operator to run and analyze the results of a selected process. The operator screens are shown in FIG. 8a and Tables 6-16.

The primary difference between the operator and engineering set up displays is that a different set of commands (i.e., tasks) are presented in the command line, and an additional line is displayed on the parameter entry screens to remind the engineer as to which colors correspond to the four parameter types: forced entry, single forced entry, operator alterable, and operator unalterable. Also the engineer set up screens have a yellow band around the edge of the display to distinguish them from the operator screens, which use a green band. A typical engineering set up screen is shown in FIG. 8b.

As shown in FIG. 8b, the engineer set up program can access all of the index cards, except the test results cards (which do not contain any parameters to be set up by the engineer). Also the command line includes an OPTION command for setting the status of each parameters (as forced entry, etc.), and an UPDATE command for storing the revised parameter data structure onto disc.

For all of the parameters used by a selected process, such as the ones shown in Tables 6–16, the engineer must perform two functions: (1) entering default values for those parameters which have a typical or fixed value; and (2) denoting each parameter as being forced entry, single forced entry, alterable or unalterable—thereby controlling the range of discretion allowed to the operator.

The parameter names shown in Tables 6–16 are predefined by the process control program (CONTOUR MAP in this case) associated with the specific process being set up. The engineer may not alter these in this example. It should be recognized, however, that the engineering control program may be configured, if desired, to permit the addition of optional data type parameters by the engineer.

To perform the test set up, the engineer positions the cursor or pointer at each parameter, and then either types in a value or toggles the item through preset choices for each parameter, using the up/down cursor control keys. For example, the NUMBER OF SITES parameter (see Table 8a) has a fixed set of optional values which must be toggled through (e.g., by repeatedly pressing the TOGGLE ACTIVE command box or the down cursor key of the system's keyboard) until the desired value is selected.

After the parameter value is set or entered, the OPTION command is used to toggle through the four choices of Unalterable, operator Alterable, Forced operator entry, and Single forced operator entry. These four different options are reflected on the engineers display using the same color coding as seen by the operator when entering parameter values (i.e., red for Forced entry parameters, yellow for Singe forced entry parameters, light blue for operator Alterable parameters, and black for fixed value operator Unalterable parameters).

It should be noted that, whenever necessary or desirable, the operator control program is programmed to include instructions for performing a validity check on operator entered parameter values. For instance, date and wafer identification entries can be checked against a predefined set of verification rules. In an alternate embodiment, the engineer could be permitted to set up a supplemental test function to establish a particular format and/or other constraint for the parameter value or date to be entered.

The first screen to be displayed when the engineer selects a folder for set up is the WAFER FACTS screen, shown in FIG. 8b. The parameters shown in the WAFER FACTS card are usually not given a default value because these parameters are primarily used for identifying the wafer being tested, the operator, the process time and the data collection time. The primarily role of the engineer in setting up these cards is to select which parameters must be entered before the process will be allowed to run.

The engineer may enter a note to the operator into the MEMOS & NOTES card. Generally, the upper half of this card is locked (so that it cannot be changed by the operator), and the bottom half acts as a note pad for the operator to enter notes to the engineer.

The TEST SETUP card (Table 8b) is the screen in which the engineer selects the process control program (i.e., the type of test program) to be used by the process associated with this folder. In the preferred embodiment the available test types are called CONTOUR MAPPING, DIAMETER SCAN, and QUICK TEST. The choice of the process control program determines the parameters which will be displayed on the index cards for parameter entry.

In other words, the test type selected by the engineer will affect the detailed format of the index cards used for parameter entry, as explained above with respect to FIG. 12 (Data Structures). Also, certain parameter values affect the detailed format of the index cards. For instance, the value assigned to the PLOT LIMITS parameter for Trend Charts affects whether MIN and MAX parameters will be shown. Generally, the overall look and feel of the index card displays does not change. Only the formatting and selection, of the parameter lines is affected by certain ones of the parameters.

All changes made by the engineer to the parameter definition screens are reflected in the parameter data structures 150 as described above with reference to FIG. 12.

After the parameters for the parameter screens have been defined, the engineer uses the UPDATE command (see FIG. 8b) to store the revised parameter data structures 150 on the disc 40.

This test setup must be done for every one of the configured processes. While this is a time consuming task, it is one which is very easy to perform in a straightforward manner using the friendly tools which are incorporated in the engineering set up program.

Process Definition Duplication

Referring to Table 19 (Main Menu), the DUPLICATE TESTS task in the TEST DEVELOPMENT task group can be used by an engineer to greatly reduce the effort involved in setting up a large number of processes. When the DUPLICATE TESTS task is selected, a screen similar to the process selection screen (such as the one shown in Table 20) is provided, except that the tasks on the command line are: SELECT SOURCE, SELECT DESTINATION, COPY PROMPT, COPY PARAM, COPY P&P, and COPY DATA.

The SELECT SOURCE box is used to select a folder, drawer or cabinet that the user wants to copy. The SELECT DESTINATION box is used to select one or more items at the same menu level as the selected source item. Then, by using one of the copy boxes the corresponding data structures are copied from the selected source to the selected destination(s). Using the COPY PROMPT box causes the process name and availability data structures to be copied; the COPY PARAM box is used to copy the parameter data structure, or selected parameters within the parameter data structure; the COPY P&P box is used to copy the parameter and the process name and availability data structures; and the COPY DATA box is used to copy the measurement data structures As will be appreciated by anyone who considers the matter, being able to copy the process name and parameter data structures greatly reduces the effort required to set up a large number of similar but somewhat different processes.

Quick Test Toggle/Edit Field Definition

While some parameters are assigned a value from a predefined toggle set, such as the predefined set of TEST SITES values, other parameters use toggle sets set up by the engineer.

The tasks for defining toggle and edit fields is selected from the Main Menu, shown in Table 19. In the preferred embodiment, there are two toggle/edit fields which are defined by the engineer: the Quick Test types, and the Correlation Curve functions which can be used to compensate for nonlinearities in the measurement equipment. The following is a description of how Quick Test types are defined. The Correlation Curve function set up is similar to the Cauchy Coefficient portion of the Film Type definition task—described below in the section on Alternate Embodiments of the invention.

The two level dynamic menu shown in FIG. 9, discussed above, is used to set up Quick Test types, which are then available for selected by use of a toggle button, or by viewing the screens shown in FIGS. 9, 9a and 9b. The names shown in the left menu are Quick Test names which are available for use as a Quick Test parameter value during test set up (see Table 8b). The right menu shows the data measurement locations corresponding to the currently selected Quick Test type.

As shown at the bottom of FIG. 9, the preferred embodiment has data structures for storing thirty Quick Test types, and each Quick Test can be given up to thirty data measurement locations. The first fifteen Quick Tests are predefined tests which are generally not changed, and the second fifteen Quick Tests are user definable.

FIG. 9a, which is displayed by touching the PAGE command when viewing the display in FIG. 9, shows the second page of Quick Tests—which are the user definable tests. New Quick Tests are defined by pointing to an unused slot in the Quick Test menu and typing in a name, which can be up to twenty characters long. Then the active pointer is moved to the right hand menu, and the engineer enters the radial and angular positions of up to thirty wafer locations which are to be tested whenever the selected Quick Test is used.

FIG. 9b, which shows data locations 16–30 for the 16th Quick Test, is displayed by moving the active pointer in FIG. 9a to the right hand menu and then using the PAGE command.

Overview of First Preferred Embodiment

From the above discussion, it should be apparent that the system and method of this invention provides to the engineer all of the advantages discussed in the introductory section of this specification. Specifically, with respect to the use of the invention in connection with setup of an automated resistivity tester, it should be apparent that the engineer is provided with tools to easily and conveniently set up multiple test process configurations, each with individual parameter status control and availability control. The results of all of this setup effort are stored in associated data structures and not on a collection of documents which can get lost, garbled or misinterpreted.

Furthermore, the engineer can, at will, revise any of the configured test processes by direct revision of data structure values rather than dealing with revising process instructions on paper. If the engineer wishes to maintain records of the prior configurations, these can be stored on one of the operator-related disks, ,but with all process groups disabled so that the disk cannot be mistakenly used by an operator. This, in itself, eliminates the "paperwork confusion" that often surrounds process revision level documentation and the mistakes that can be made by an operator who uses an obsolete version of written process instructions. If the engineer proceeds carefully with use of the tools provided by the system and method of this invention, all of the operator-related disks will only have enabled process configurations which ar current and correct.

While the system and method of this invention does not avoid the time consuming task of setting up multiple test processes, once the engineer has learned to use the tools provided by the system and method of this invention, the engineering setup tasks can be performed much more efficiently and effectively. By eliminating the drudgery of maintaining documentation and by providing convenient process set up, operator control, and analysis tools, this invention will encourage more widespread, effective use of computer controlled testing.

Alternate Embodiments

The inventors have implemented two additional embodiments of the invention. The first alternate embodiment is virtually identical to the resistivity tester system described above, except that it measures film thickness on semiconductor wafers. The second alternate embodiment will be sold under the assignee's LITHOMAP trademark, and is a multiple parameter measurement system used for measuring numerous parameters on test wafers. This embodiment provides a logical and powerful set of tools for analyzing any one or combination of the measured parameters.

Film Thickness Measurement System

As noted above, the Film Thickness Measurement System is extremely similar to the resistivity measurement system described above The only feature of the film thickness measurement system described here is a method of defining "nested" toggle/edit fields for complex parameters. This is an enhanced version of the basic toggle/edit field setup described with respect to FIGS. 9, 9a and 9b.

The technological background of this feature is that measurement of the thickness of a film on a semiconductor substrate requires knowledge of the thickness and composition of the layers underlying the layer being measured. The index card used during test set up for providing film thickness values is shown in Table 21. Clearly, once the sequence and composition of the underlying layers is known, it is easy to use the above described "index card" parameter entry system (or another comparable system) for entering thickness values for the underlying layers.

The problem addressed here is how to provide a convenient mechanism for defining the sequence and composition of the underlying layers.

Figure 14:
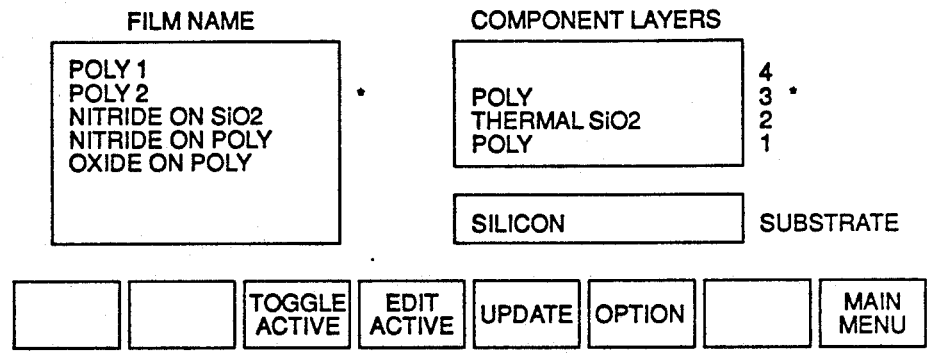

Referring to FIG. 14, there is shown one of the two displays used to define a sequence of underlying film layers. This display is a two level dynamic menu, in which the left hand men shows the Film Names which have already been defined. This is the list of available names for use in the FILM TYPE parameter as shown in Table 21.

The right hand menu represents the sequence of film layers corresponding to the currently selected Film Name in the left hand menu. When a Film Name is selected for use, the corresponding sequence represents the film layer composition of the wafer to be tested.

The film layers start with the substrate on the bottom, and continue upwards, with as many as four component layers on top of the substrate. The top most layer represents the layer whose thickness is to be measured. The other layers have known, or at least approximately known, thickness.

The engineer can use any twenty character string for each of the Film Names in the left hand menu, and any twenty character string for each of the film component layers. The names have no predefined meaning. Clearly, however, the names will generally be given meaningful names to help users of the system.

Thus a Film Name is defined by pointing to empty slot in the Film Name menu, and typing in a name, such as "POLY 2". Then the sequence of layers is defined by moving the active pointer to the Component Layers menu. Each component's name is entered not by typing in a name, but rather by use of the TOGGLE ACTIVE or EDIT ACTIVE commands. To facilitate this explanation, assume the engineer moves the display's active pointer to the Substrate item and then used the EDIT ACTIVE command. The system will respond by displaying FIG. 15.

Figure 15:
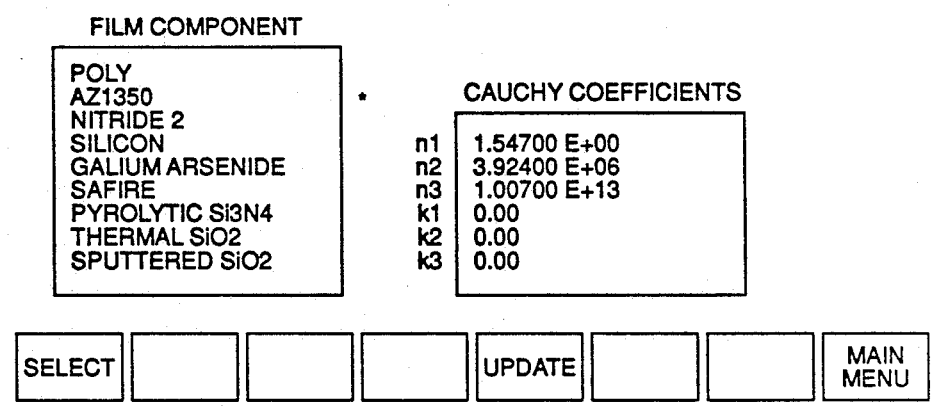

The two level dynamic menu shown in FIG. 15 is used to define film layer (i.e., component) names, and a set of Cauchy coefficients corresponding to each film layer name. The right hand menu presents the Cauchy coefficients for the film layer item selected in the left menu. Thus the film layers used in FIG. 14 are selected from the film layers defined in FIG. 15.

As the active pointer in FIG. 15 is moved down the Film Component menu, the right menu displays the Cauchy Coefficients for the Film Component currently being pointed to. To revise the Cauchy Coefficients, or to enter values for a new layer, the engineer moves the active pointer to the right hand menu, and then enters the appropriate values.

Note that Cauchy coefficients define the relationship between the wavelength of light incident on a film layer and the index of refraction at that wavelength. The Cauchy coefficients depend on the composition of the film layer, and thus a separate set of coefficients needs to be defined for each type of film layer used on the wafers being tested.

In summary, the task associated with FIG. 15 is used both to define film component names and their Cauchy coefficients. Furthermore, when the SELECT command is used, the system returns to FIG. 14 and enters into the currently selected Component Layer slot the Film Component being pointed to in FIG. 15. Thus the Film Components menu in FIG. 15 is a list of items for use as Component Layers in FIG. 14. This is the function of an "Edit" field.

The Film Type parameter (see Table 21) is a multidimensional parameter in that the parameter's value specifies a plurality of items, each of which is defined by a plurality of subparameters. The edit fields used to define these parameters are called nested, or multidimensional edit fields.

As will be understood by those skilled in the art, nested edit fields can be used in an a variety of different hierarchical arrangements for specifying a set of subparameters corresponding to each value of a primary parameter.

In the preferred embodiment, the items which can be selected through the use of an edit field, can also be selected by successive uses of the TOGGLE ACTIVE command. When TOGGLE ACTIVE is used, the display remains unchanged except that the slot or menu item being pointed to is given a new value selected from the list of options defined using the EDIT ACTIVE task.

FIG. 16 shows the data structures for defining a set of Film Names, including an array of up to five film components for each film name. For each Film Name there is an option flag which denotes whether the Film Name is available for use by the operator control program. The status of each Film Name can be toggled by use of the OPTION command when the active pointer is pointing to the Film Name. The engineering set up program displays available Film Names with a light blue background and unavailable ones with a black background. The operator control program does not display film names which have been denoted as not available.

Using the status feature, the engineer may allow the operator to change the FILM TYPE parameter in some processes, but can limit the choices available to the operator by making some of the defined Film Names not available. Note that there is only one Film Name data structure in a system—and thus the status flags (or options) affect the availability of these Film Names in every folder or process.

FIG. 16 also shows that there is a separate pair of arrays for defining the names of the available film components, and their Cauchy coefficients.

Multiparameter Measurement and Analysis System

Figures 17, 22A:
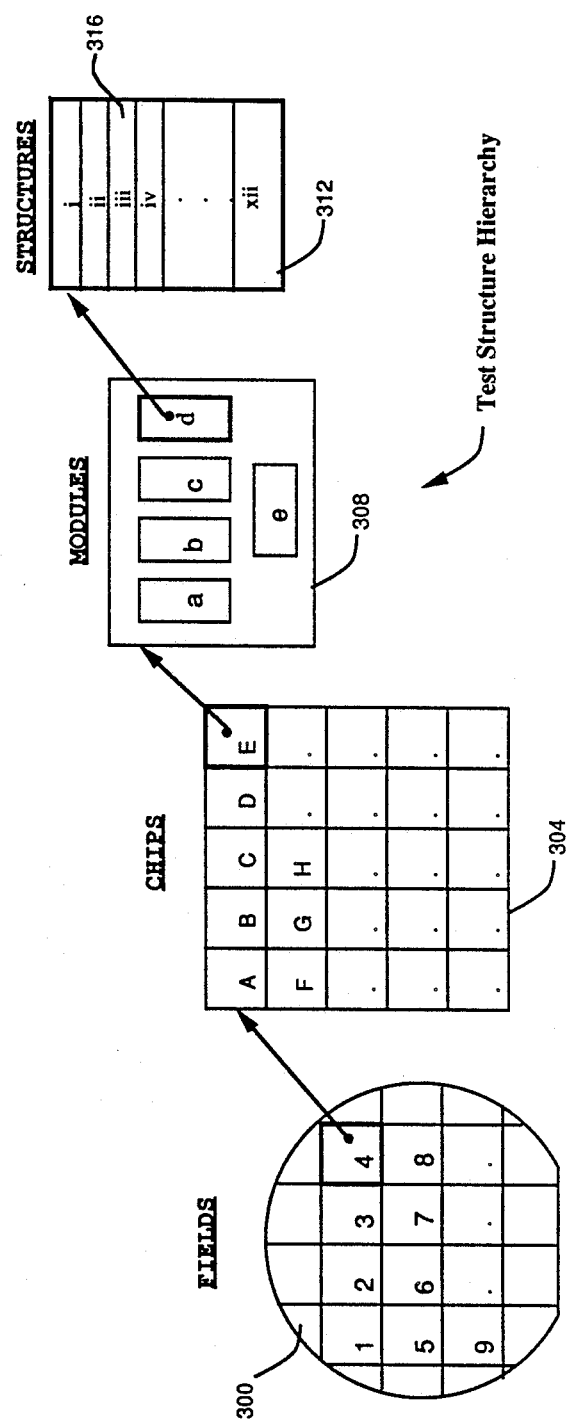
FIG. 17 depicts the test structure hierarchy used in a second alternate embodiment of the invention in which multiple parameters are measured and analyzed.
FIGS. 22 and 22a depict a test data file.

The second alternate embodiment is a multiple parameter measurement system used for measuring numerous parameters on test wafers. FIG. 17 schematically depicts a test wafer 300. As shown, the wafer is hierarchically organized into an array of fields; each field 304 contains an array of chips; each chip 308 contains a plurality of modules; and each module 312 contains a plurality of test structures 316.

Background Information Regarding Semiconductor Testers and Test Structures

As is well known to those skilled in the art, semiconductor test structures 316 are physical circuit structures and semiconductor film structures which are typically tested by applying a voltage or current and then measuring the resulting voltage or current.

The pattern of test structures in each chip 308 is called a mask pattern. The chip 308 has a specified height and width, and the mask pattern defines the position and design of the test structures within the chip.

Figure 18:
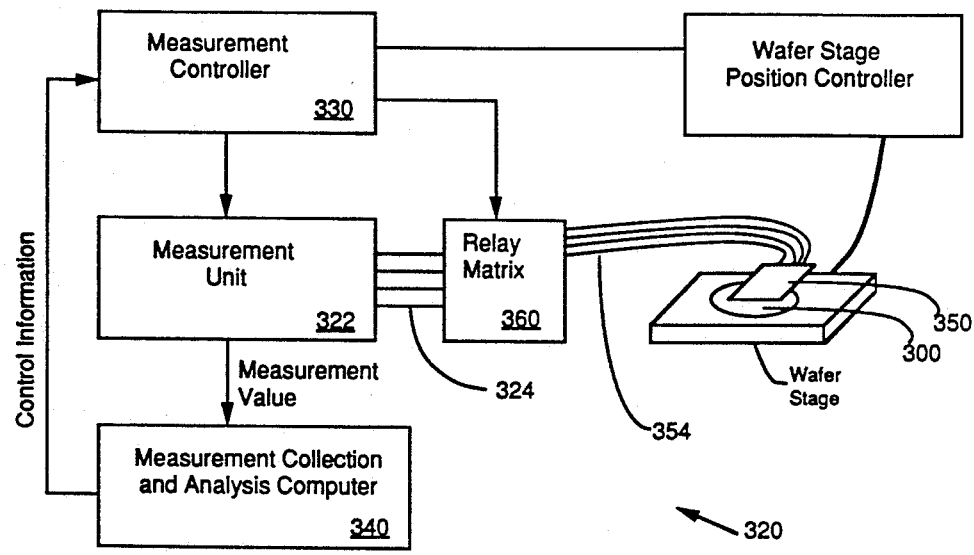
FIG. 18 depicts a lithography tester.

Referring to FIG. 18, there is shown a schematic diagram of a wafer tester 320. The basic components of the tester 320 are a measurement unit 322 which can perform electrical tests by imposing voltages and/or currents on selected terminals 324, and measuring the resulting voltages and/or currents on other selected ones of its terminals 324. A measurement controller 330 specifies the test to be performed by the measurement unit 322 in accordance with instructions from a measurement collection and analysis computer 340.

As will be described below, the computer 340 contains all the information needed to define the tests to be performed on a wafer using a defined mask pattern.

Test structures are typically microscopic in size, and they are accessed by precisely positioning a probe card 350 over a module 308 of structures (actually by moving the wafer stage so that the wafer 300 is at a specified location under the probe card) and thereby making an electrical connection between the test structures and the tester 320. Since test structures come in many shapes and sizes, and mask patterns are not standardized, probe cards are custom made in accordance with the mask pattern being used. Normally, a separate probe card 350 is used with each module 312.

Since a module may contain a dozen or more test structures, the probe card 350 will typically contain dozens of separate electrical lines 354 for individually contacting all of the electrical terminals associated with the corresponding module. The tester 320 includes a probe card database which defines the relationship between each probe card's electrical lines 354 and the test structures to be tested. The tester 320 also has an array of relays 360 which can be programmed to connect any specified probe card line 354 to any one of the measurement terminals 324.

Thus the tester 320 tests the structures in a module by sequentially, for each of the structures to be tested, (1) programming its relays to contact the selected structure, and (2) then testing the structure in accordance with a predefined test sequence for that structure.

It should also be noted that there are a number of specific types of test structures which are commonly used in test wafer patterns. These include:

| Test Structure Classification | Purpose |
| --- | --- |
| line width | measuring line widths |
| registration | detecting misalignments between semiconductor film layers. |
| open | detecting open circuits that should be closed |
| shorts | detecting short circuits where there should be no connection |
| contact | testing interlayer contacts |
| interlayer shorts | testing for interlayer shorts |
| sheet resistance | measuring the sheet resistance of a film |

Each test structure classification includes many different test structures. This list is meant only to show a sampling of the basic types of test structures commonly used.

User Interface For Specifying Data Analyses to be Performed

Prior art wafer testers have been difficult to use because they have no convenient mechanism for specifying a subset of the test structures to be tested, and because they have no convenient mechanism for generating trend charts for various ones and combinations of the measurements.

Measurement of all the test structures on a wafer is usually a very time consuming process. Furthermore, if the user is concerned only with one apparent problem in a wafer production line, such as an apparent registration problem, then only data from a subset of the test structures is going to be of interest to the user.

The present invention provides a logical and powerful set of tools for specifying which test structures in a predefined mask are to be tested. The system also provides a menu driven mechanism for defining a set of trend charts—each of which represents the progression over time of any specified measurement or combination of measurements.

For instance, the user can define a first trend chart showing the mean and standard deviation of the measurements of a specified line width test structure. A second trend chart can show the average measurements from a set of four line width test structures. A third trend chart can show the difference between the two measured line widths. Additional trend charts can be defined for other test structures, including charts for single measurements and charts for specified combinations of measurements.

When a test wafer is processed by the invention, only the test structures specified in a selected test definition file are measured.

Also, when a test wafer is processed, the data for each of the defined trend charts is automatically computed and added to a file so that any of the specified trend charts can be generated quickly.

Folder Selection. As in the first preferred embodiment described above, the wafer testing system in the preferred embodiment provides a 9 by 9 by 9 array of "folders" or "processes", each of which can be used to define a wafer test protocol. Folders are selected for set up, and for use after set up, using a three level dynamic menu essentially equivalent to the one shown in Table 20.

Figure 19:
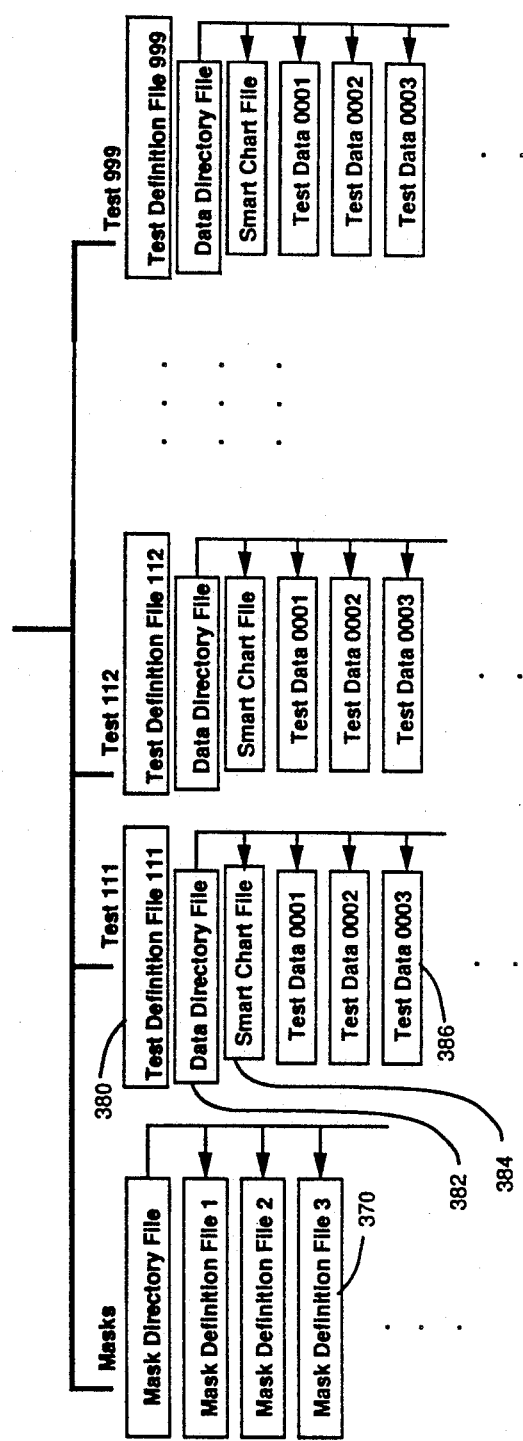
FIG. 19 depicts the file organization used in the second alterate embodiment.

Data Structures. The data structures used for setting up test protocols and for collecting data are shown in FIG. 19. As shown, there is a set of mask definition files 370, each of which defines a mask pattern of test structures.

Then, for each of the 729 folders there is a test definition file 380, a data directory file 382, a smart chart file 384, and a set of test data files 386. Actually, since these data structures take up a fair amount of disk space, these data structures are created only for folders which have been set up.

It should also be noted that the discs used in this embodiment of the invention are 20 Megabyte disk cartridges so that large amounts of data can be stored and so that wafer fabrication parameters can be tracked for a significant period of time before the disk is filled.

Table 22 shows the format of a mask definition file 370. The mask definition file defines a set of modules and their test structures by specifying the locations of the modules, and by specifying for each test structure its position relative to its module, the type of test structure it is, the probe card pins to be used for testing the structure, and any additional parameters needed to define the structure.

FIG. 20 shows the format of a test definition file 380. This file defines which fields are to be tested, which chips in each field are to be tested, and which test structures in each module are to be tested. Thus, the test definition file is set of flag arrays. The file 380 also references the mask definition file which defines the mask layers and test structures.

Looking at FIG. 17, it can be seen that each wafer is divided into a number of fields. The first array in the test definition file determines which fields are to be tested. The array positions with 1's correspond to fields which will be tested, and the positions with 0's correspond to positions to be skipped.

Similarly, each field is divided into an array of chips, and the second array in the test definition file determines which chips are to be tested.

The last set of arrays corresponds to the mask pattern defined in the selected mask definition file, in that the number of modules and the number of items in each module is defined by the mask definition file.

FIG. 21 shows the format of a smart chart file 384. This file contains two arrays. The first defines up to forty trend charts. For each chart there is specified an opcode and a list of the test structures from which the data will be used. The opcode specifies whether the chart will track one specified measurement, the average of a set of specified measurements, or the difference between two specified measurements. The opcode also specifies whether the data to be plotted is the mean and standard deviation of the Measurement data or the mean and range, or the defect rate.

The second array in the smart chart file 384 is an array of the data to be plotted on each trend chart. Thus the data values to be plotted in all of the defined trend charts are computed and stored when the test data is collected. In this way, the trend charts can be generated quickly, without having to perform enormous numbers of calculations each time a chart is to be generated.

Figure 22:
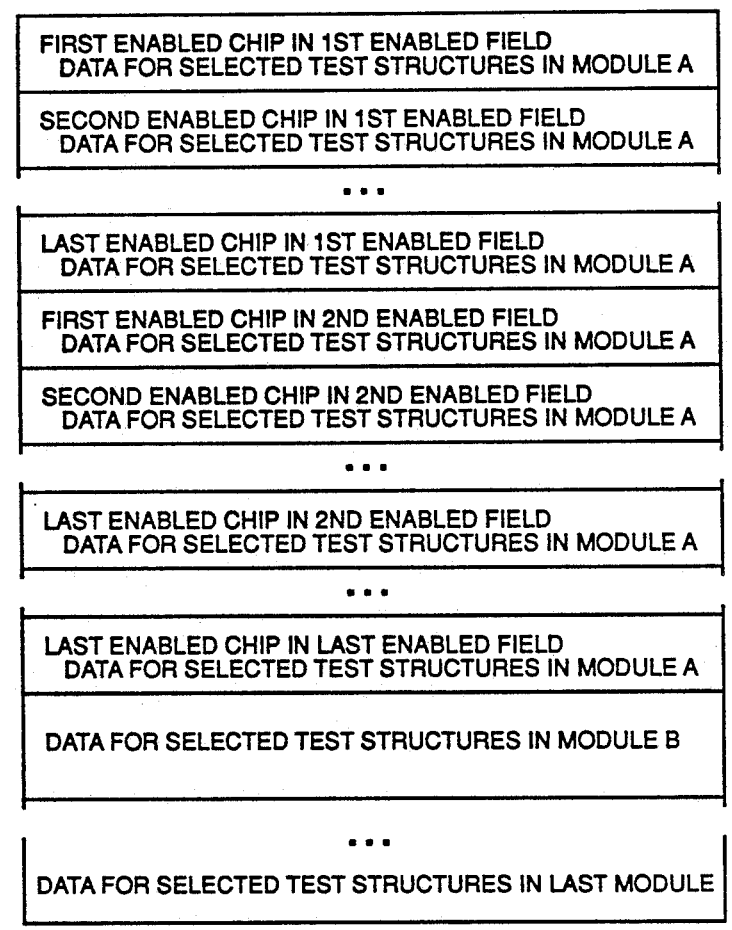

FIG. 22 shows the format of a test data file 386. Basically, the raw measurement data is stored in the same order that it is measured. Since one module is tested at a time, all the data from the first module is stored first, followed by the data from each of the other modules.

Also, the tester generally probes all of the enabled chips in each field before preceding to the next field. Thus the data in the test data file follows the same pattern.

FIG. 22a is another view of the structure of the test data files.

Looking at FIGS. 20-22 collectively, the selected test structures are those which have been selected for use in one or more Trend Charts—as specified by the Smart Chart Definitions. Also, the test data file is structured in accordance with test definition file to eliminate the need to leave room for measurements not taken.

At the end of data collection, all of data for the trend charts are computed and added to the end of the smart chart file 384.

The data directories shown in FIG. 17 are used to keep track of the locations of the test data files 384 for each folder. As shown in Table 23, the data file directory also contains the process set up parameters (e.g., process date, collection date, lot id, wafer id, operator) for each data file, so that the trend chart generator can limit the scope of the data plotted in accordance with specified date limits or lot/wafer id limits.

Figure 23:
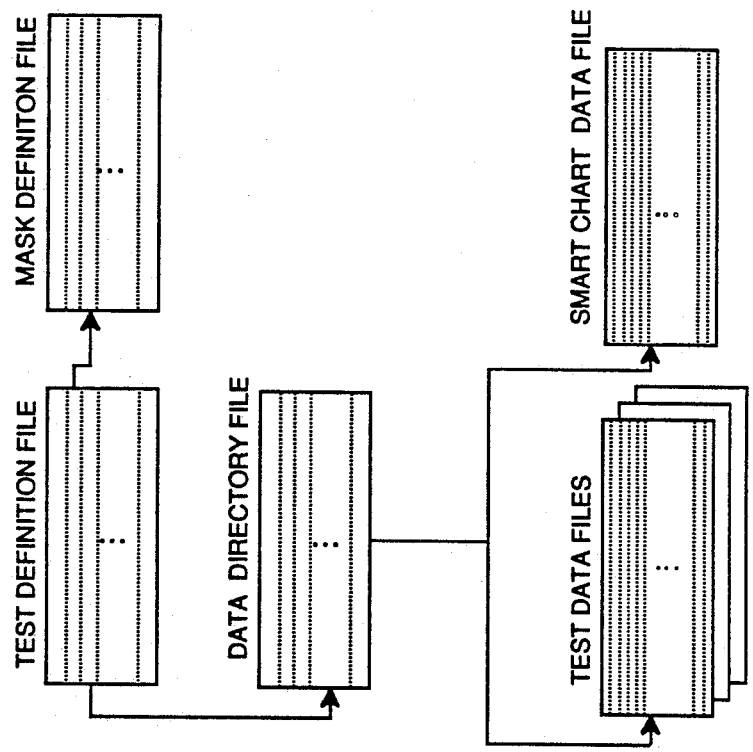
FIG. 23 depicts the relationships between several different types of files in the second alterate embodiment.

FIG. 23 depicts the relationships between the test definition file, the mask definition file, the data directory file, and the corresponding test data files and smart chart data file.

Trend Chart Set Up

The multiparameter wafer testing system uses an engineering set up program and an operator control program in much the same way as the resistivity mapping system described above.

Figure 24:
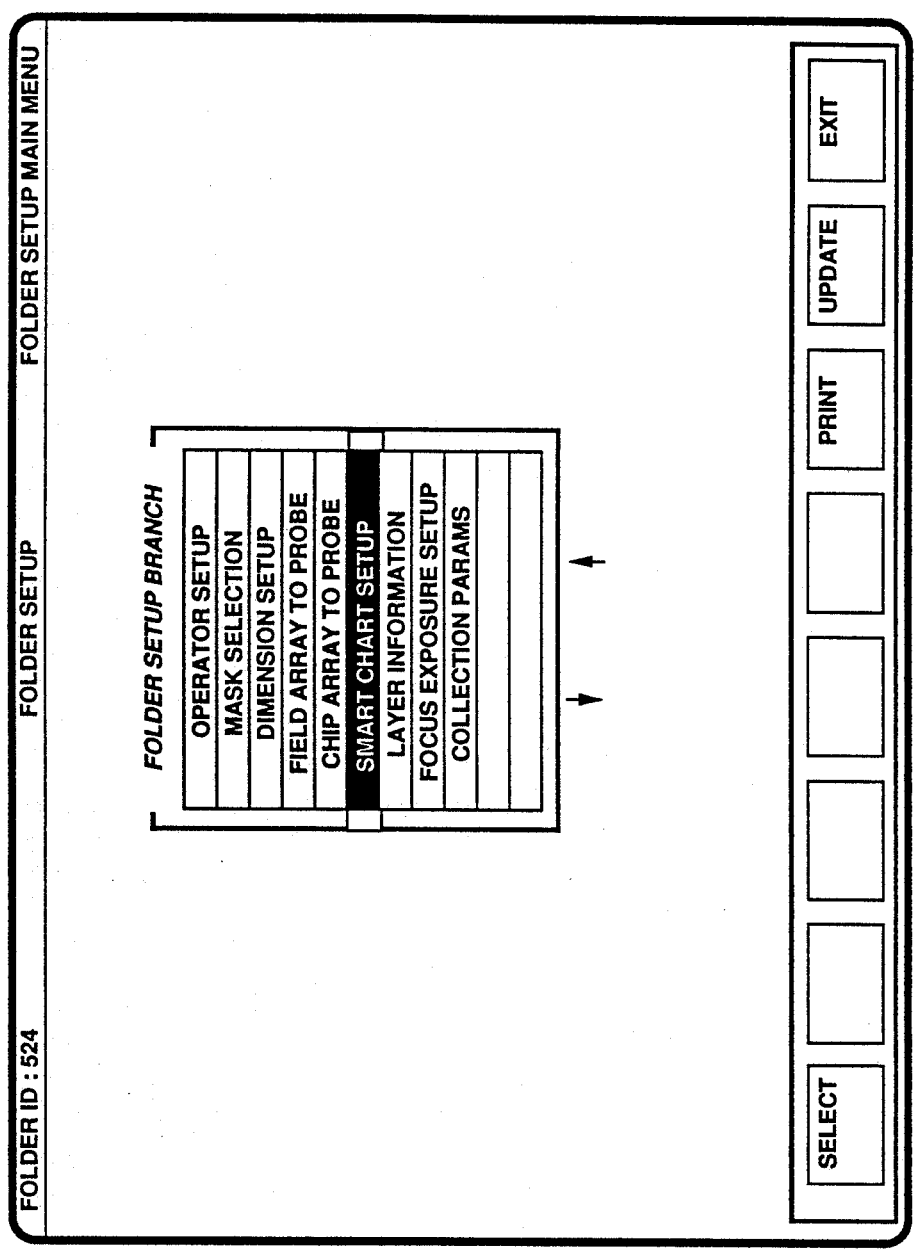

When a folder is selected for engineering set up, the first display seen by the engineer is the one shown in FIG. 24. The tasks shown in the Folder SetUp menu are a series of tasks for specifying: the parameters which need to be entered by an operator before the test process will be run, the mask pattern being used, the fields and chips to be tested, and the test structures to be probed. The operator parameter set up is virtually the same as the set up for the Wafer Facts and Notes & Memos cards discussed above with respect to Tables 6 and 7.

The selection of fields and chips to be probed is accomplished by presenting a field map, and a chip map, and allowing the user to indicate which fields and chips are to be enabled for data collection. The user touches the system's touch screen at the appropriate places until all the fields and chips to be enabled are highlighted, and the other fields and chips are not highlighted.

The set up of trend charts is considerably more complicated. In the preferred embodiment, the trend chart set up task works as follows.

Note that trend charts are called "smart charts" in the preferred embodiment, but the term "trend chart" will be used in this description.

Figure 25:
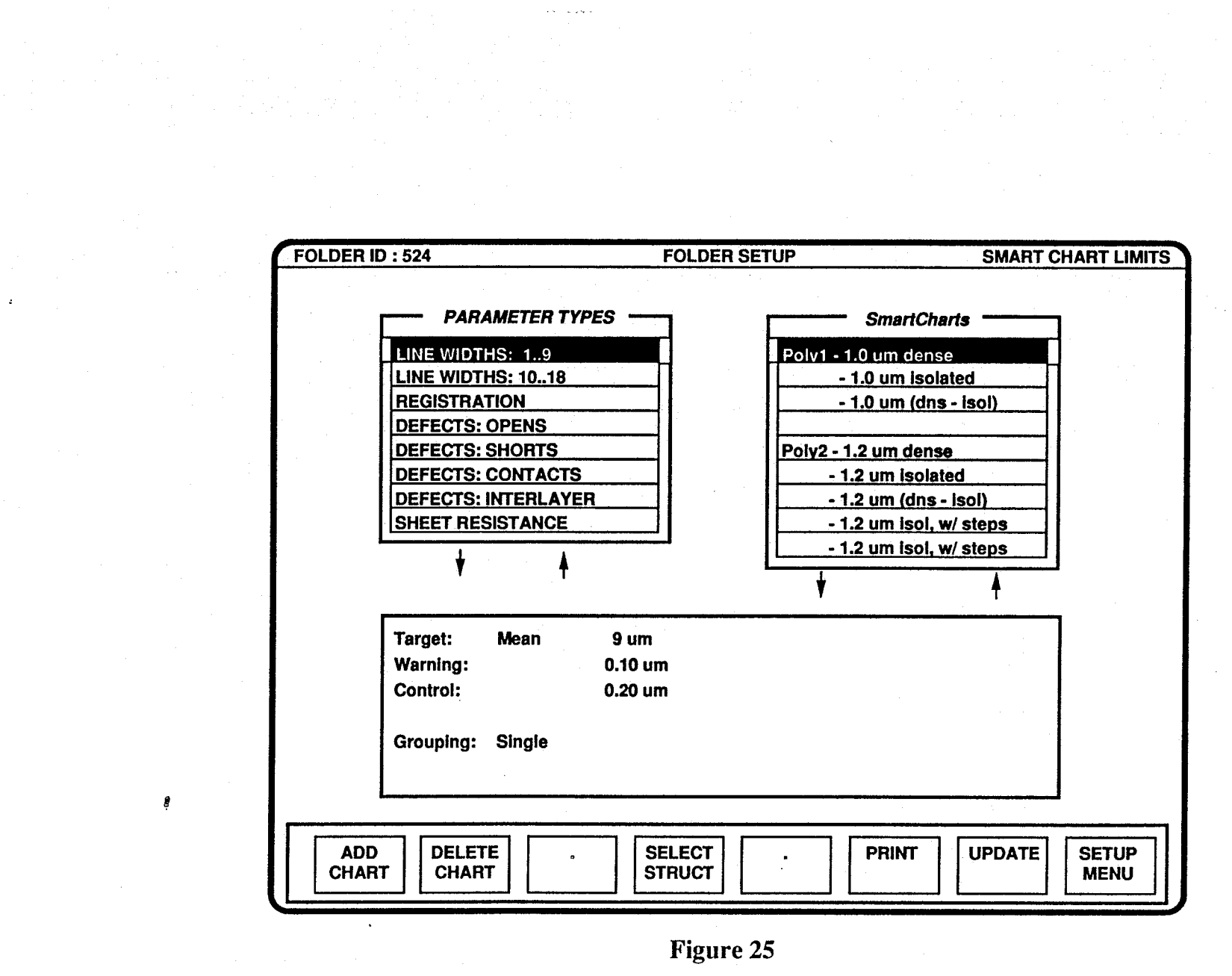

FIG. 25 shows the first display used for defining new trend charts. This display is shown when the "smart chart setup" item is selected in the Folder SetUp men shown in FIG. 24.

FIG. 25 is a three level dynamic menu. The Parameter Types menu in FIG. 25 contains a list of the types of test structures included in the selected mask. The right menu, entitled SmartCharts is a list of the trend charts corresponding to the selected Parameter Type (i.e., to the parameter type being pointed to in the left menu). If no charts have been defined for a selected parameter, then this menu is empty.

The bottom menu shows the definition of the trend chart item being pointed to in the right hand menu.

To add a new trend chart, the engineer selects a parameter type (such as line widths), then points to an empty slot in the SmartCharts menu and selects the ADD CHART task. The system responds by generating the display shown in FIG. 26.

Figure 26:
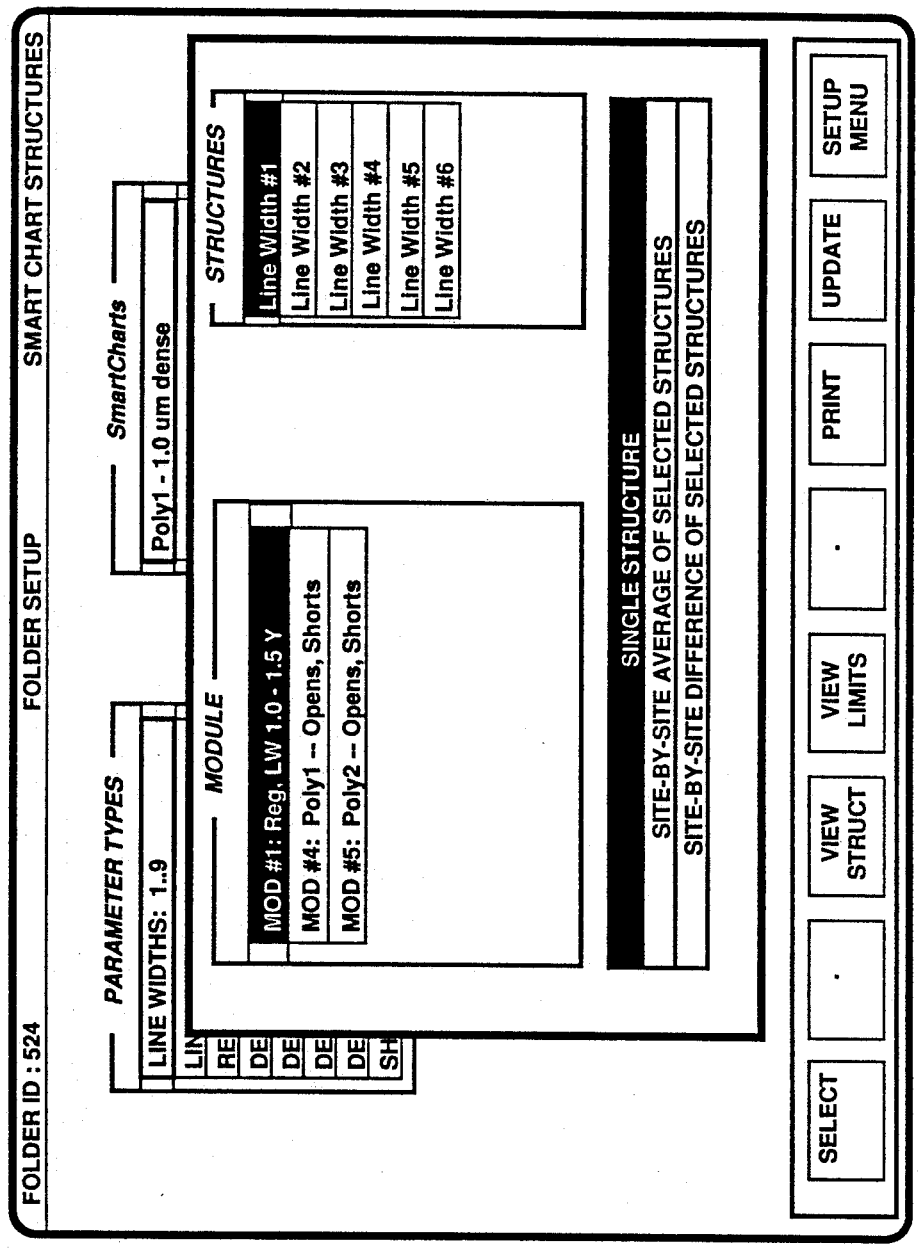

As can be seen in FIG. 26, the system has overlayed a structure selection menu on top of the previous display. The MODULE and STRUCTURES menus are a two level dynamic menu which displays all the test structures of the selected parameter type. As explained with reference to FIG. 17, the test structures are organized into modules, and the structure selection menu reflects this organization.

The default trend chart type is to chart a single test structure. The structure is selected by moving the active pointer until it points to the appropriate structure name in the STRUCTURES menu, and then using the SELECT command. The selected item will be highlighted on the display.

To chart the average of several measurements, the engineer touches the box on the screen which says SITE-BY-SITE AVERAGE and then SELECTS all of the structures whose measurements are to be averaged.

To chart the difference between two measurements, the engineer touches the box on the screen which says SITE-BY-SITE DIFFERENCE, and then SELECTING two structures. The measurement from the second selected structure will be subtracted from the measurement of the first selected structure.

After the structure or structures have been selected, the engineer moves back to the display in FIG. 25 by using the VIEW LIMITS command. Note that the VIEW STRUCT command provides the user with detailed mask definition information regarding the items in the STRUCTURES menu.

Finally, in FIG. 25, the engineer uses the bottom menu to specify target, warning and control limits for the parameter to be charted. Note that for some parameters, the target and limits values are measured in physical units. For instance, line width limits are typically specified in units of microns. Also, the engineer may specify how the selected parameter is to be charted, selecting a method from a set such as:
- mean and stdv
- mean and range
- maximum value
- coefficient derived by applying a mathematical model to the measured data Some parameters, such as defect density and percent yield for the case of opens and shorts test structures, do not have "mean and standard deviation values"—and for these types of. parameters only the defect rate or percent yield is charted. For such parameters the target and limit values are usually specified in terms of a defect density (such as a certain number of "defects per square centimeter").

Figure 27:
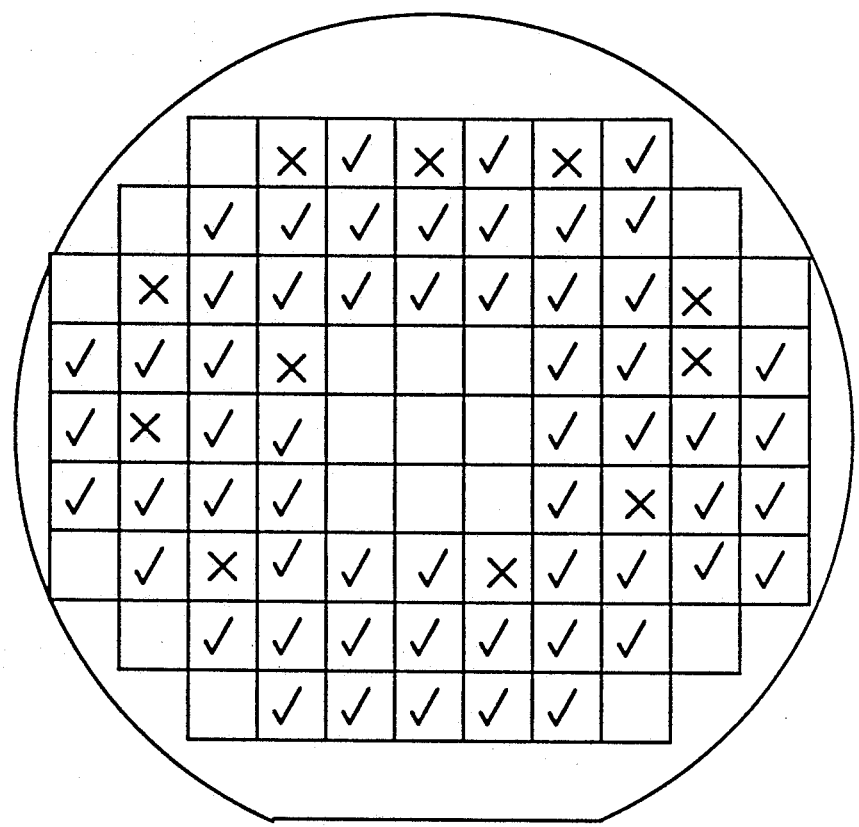
FIG. 27 depicts a defect data map.

Note that the data display for a defect density parameter, is a map of the test wafer showing which chips which passed (i.e., which had a defect rate within the specified limit) and which did not. In the preferred embodiment, chips which pass are colored green, chips which did not pass are colored red, and chips not tested are colored black. FIG. 27 shows a example of a defect data map, with passed chips marked with a check mark, failed chips marked with an X, and untested chips unmarked.

The target and limit values for each trend chart are stored as part of the trend chart definition, as shown in FIG. 21.

Operator Control Program

The operation of the operator control program is basically the same as in the resistivity measurement system described above. This section concerns only operator access to the analyses, i.e., to the trend charts defined by the engineer.

Figure 28:
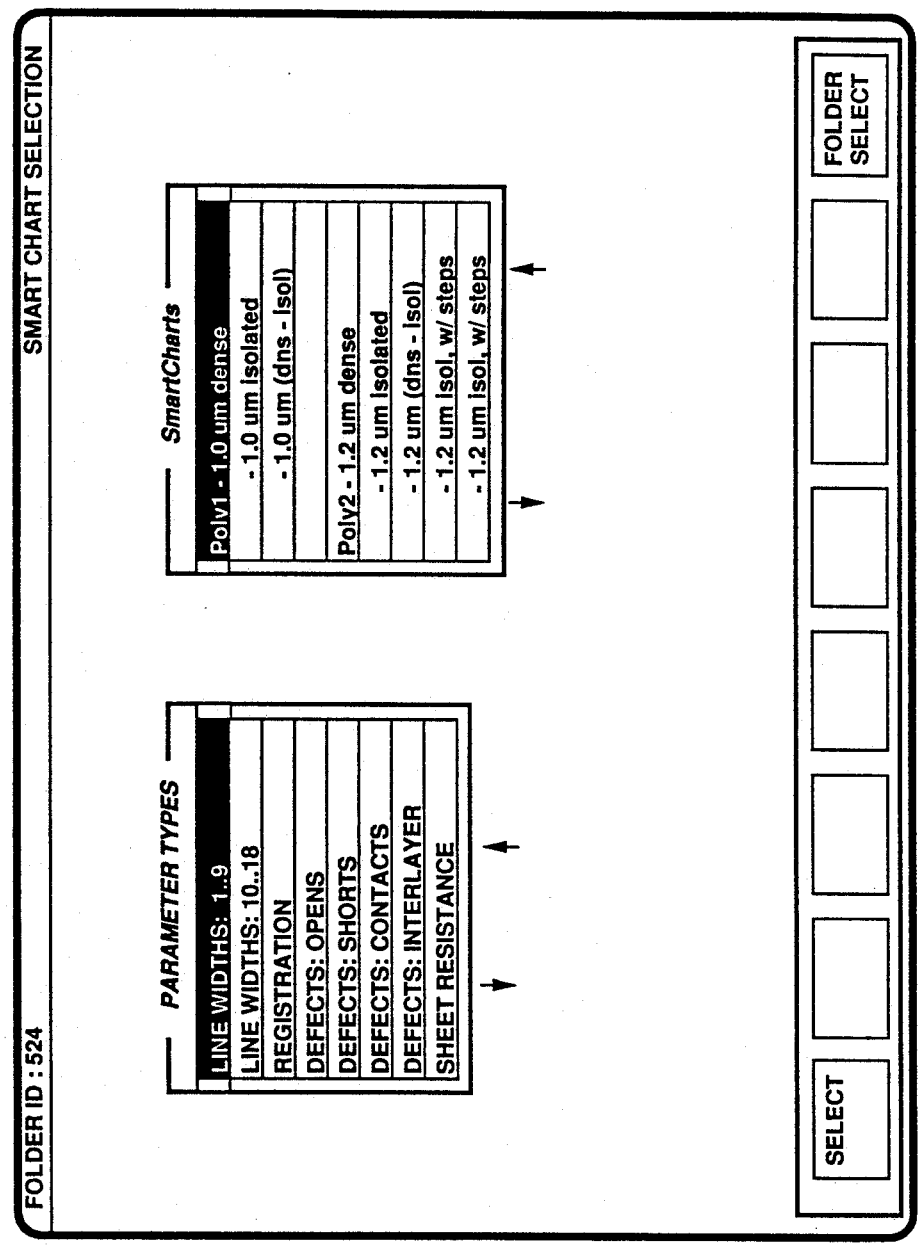
FIG. 28 depicts a display for selecting a trend chart to be generated.

The operator can access any of the trend charts for a specified folder using the Trend Chart Selection menu shown in FIG. 28. This menu is used for Trend Chart selection after a test has been run, and it can also be accessed directly from the Folder Selection Menu. As can be seen, the operator's Trend Chart Selection menu uses the same format as the engineer's Trend Chart SetUp menu shown in FIG. 25. The operator selects a chart by pointing to the name of the chart which he wants to view and uses the SELECT command to initiate generation of the selected chart. The trend chart display uses the same format as the one shown in FIG. 4, and the operator can modify the range of test data files represented on the chart by using the MODIFY PRMTRS command—which provides access to Trend Chart control parameters, such as those shown in Tables 13 and 14 for the resistivity measurement system.

In summary, the multiparameter measurement system 320 described above uses the same user interface and data organization methods as used in the first preferred embodiment. The data structures have been generalized for storing and tracking multiple parameters, but the user interface remains very similar. Thus the present invention provides similar benefits in both single parameter measurement systems and in multiparameter measurement systems.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

TABLE 1

| *CABINET | DRAWER | FOLDER |
|---|---|---|
| SUB-COLLECTOR | TUBE 1 | LOAD END |
| COLLECTOR | * TUBE 2 | * MIDDLE |
| COLLECTOR PLUG | TUBE 3 | SOURCE |
| EMITTER | TUBE 4 | |
| → BASE | | |
| HIGH VALUE RESISTOR | | |
| EPI | | |
| SPUTTERED ALUMINUM | | |
| PLATINUM SILICIDE | | |

| COLLECT NEW DATA | | LOG ON NEW DISK | TREND CHART | SQR CHART | | FOLDER DRCTRY | INTRO |

TABLE 2

| *CABINET | DRAWER | FOLDER |
|---|---|---|
| SUB-COLLECTOR | * REACTOR 1 | * POSITION 1 |
| COLLECTOR | REACTOR 2 | POSITION 2 |
| COLLECTOR PLUG | REACTOR 3 | POSITION 3 |
| EMITTER | | POSITION 4 |
| BASE | REACTOR 1 - SPECIAL | POSITION 5 |
| HIGH VALE RESISTOR | REACTOR 2 - SPECIAL | |
| → EPI | REACTOR 3 - SPECIAL | |
| SPUTTERED ALUMINUM | | |
| PLATINUM SILICIDE | | |

TABLE 2-continued

| COLLECT NEW DATA | | LOG ON NEW DISK | TREND CHART | SQR CHART | | FOLDER DRCTRY | INTRO |
|---|---|---|---|---|---|---|---|

TABLE 3

| CABINET | *DRAWER | FOLDER |
|---|---|---|
| SUB-COLLECTOR | REACTOR 1 | * LOAD END |
| COLLECTOR | REACTOR 2 | MIDDLE - 1 |
| COLLECTOR PLUG | REACTOR 3 | MIDDLE - 2 |
| EMITTER | | SOURCE |
| BASE | REACTOR 1 - SPECIAL | |
| HIGH VALUE RESISTOR | REACTOR 2 - SPECIAL | |
| * EPI | REACTOR 3 - SPECIAL | |
| SPUTTERED ALUMINUM | | |
| PLATINUM SILICIDE | | |

| COLLECT NEW DATA | | LOG ON NEW DISK | TREND CHART | SQR CHART | | FOLDER DRCTRY | INTRO |
|---|---|---|---|---|---|---|---|

TABLE 4

INTRODUCTION

Prometrix OmniMap RS50
with
StatTrax

© COPYRIGHT 1985,86,87 Prometrix Corporation
VERSION 3.00

This software is an unplublished, copyrighted work and contains proprietary information of the Prometrix corporation. Use is restricted to the REGISTERED LICENSEE on DESIGNATED HARDWARE at a DESIGNATED LOCATION and is subject to the terms of the Prometrix Software License Grant. This system is serialized in the name of the REGISTERED LICENSEE and may not be resold or transferred without the consent of Prometrix Corporation.

* PATENT PENDING *
StatTrax, EasyTouch and SmartChart are Trademarks of Prometrix Corporation

| FOLDER SELECT | | LOG ON DISK | TURN ON SM200 | | PUT STGE UP | PUT STGE DN | | SETUP |
|---|---|---|---|---|---|---|---|---|

TABLE 6

Wafer Setup

Wafer Facts

| TITLE ... | PLATINUM SILICIDE TEST CASE 42 |
|---|---|
| WAFER ID ... | 001 |
| LOT ID ... | A1234 |
| PROCESS DATE ... (E) | Mar 28, 1987 |
| PROCESS TIME ... (E) | 09:40 |
| OPERATOR ... | Dave |
| PROCESS ... | Standard |
| EQUIPMENT ... | Reactor 2 |
| SHIFT ... | Day |
| STATUS 1 ... | O.K. |
| STATUS 2 ... | Alarm 3 |

| Option | | Toggle | | | | | Folder Select |
|---|---|---|---|---|---|---|---|

TABLE 7

Memos & Notes

TITLE ... [PLATINUM SILICIDE TEST CASE 42]
TO OPERATOR ... PLEASE RUN 3
... WAFERS ON DAY
... SHIFT
...
...
TO SUPERVISOR ... [WAFERS RUN AS]
... [REQUESTED]
...
...
...

| Option | | Toggle | | | | | Folder Select |

TABLE 8a

Test Setup

Test Type

TITLE ... [PLATINUM SILICIDE TEST CASE 42]
TEST TYPE ... (T)    CONTOUR MAPPING
TEST SITES ... (T)    121
WAFER DIAM ... (T)    100.00 mm/5.91 in
TEST DIAM ...          80.00 mm/5.17 in
SORTING SIGMA ...    3.0
AUTO SAVE ... (T)    NO: Auto Save is off

| Option | | | | Printout | | Update | Folder Select |

TABLE 8b

Test Type

TITLE ... [PLATINUM SILICIDE TEST CASE 42]
TEST TYPE ... (T)    QUICK TEST
TEST SITES ... (T)    5
WAFER DIAM ... (T)    100.00 mm/5.91 in
TEST DIAM ...          80.00 mm/5.17 in
SORTING SIGMA ...    3.0
QUICK TEST ... (E/T)    PROMETRIX 5
ROTATION ...           0 DEGREES
AUTO SAVE ... (T)    NO: Auto Save is off

| Option | | | | Printout | | Update | Folder Select |

TABLE 9

Current Setup

TITLE ... [PLATINUM SILICIDE TEST CASE 42]
Current ... (T)    7.50 mV 1.14 mA Aut
Va ...              7.526 mV
Vb ...              6.006 mV
Va/Vb ...           1.261
V/1 ...             6.615
Cf ...              4.530
Rs ...              3207
Count ...           2

| Option | | | | Printout | | Update | Folder Select |

TABLE 10

Test Results

File Summary

TITLE... PLATINUM SILICIDE TEST CASE 42

| | |
|---|---|
| FILE NUMBER... | 1523 |
| TEST TYPE... | CONTOUR MAPPING |
| TEST SITES... | 121 |
| MEAN... | 3259.3 |
| STD DEV... | 37.314 1.145% |
| UNITS... | OHM/SQUARE |

[Contour Map] [3D Map] [ ] [ ] [Print Values] [New Test] [Save] [Folder Select]

TABLE 11

Data Summary

TITLE... PLATINUM SILICIDE TEST CASE 42

| | |
|---|---|
| MEAN... | 3259.3 |
| STD DEV... | 37.314 1.145% |
| MINIMUM... | 3206.1 |
| MAXIMUM... | 3328.6 |
| RANGE... | 122.60 |
| # SITES/GOOD... | 121/121 |
| SORT SIGMA... | 3.0 |
| CORRELATION...(T) | NONE |
| UNITS... | OHM/SQUARE |

[Contour Map] [3D Map] [ ] [ ] [Print Values] [New Test] [Save] [Folder Select]

TABLE 12

Maps & Graphs

TITLE... PLATINUM SILICIDE TEST CASE 42

| | |
|---|---|
| CONTOUR DISP... | STANDARD |
| - INTERVAL... | 1.000% |
| 3D DISPLAY...(T) | NORMALIZED |
| - INTERVAL... | 1.000% |
| - ABS MINIMUM... | 3100.0 96.875% |
| - ABS MEAN... | 3200.0 |
| - ABS MAXIMUM... | 3300.0 103.125% |
| - ROT ANGLE... | 0 degrees |
| - TILT ANGLE... | 360 degrees |

[Contour Map] [3D Map] [ ] [ ] [Print Values] [New Test] [Save] [Folder Select]

TABLE 13

Trend Charts

```
┌─Trend Set-Up──────────────────────────────┐
│   TITLE...  │PLATINUM SILICIDE TEST CASE 42│
│                                            │
│   PLOT...              MEAN-SIGMA          │
│   SIGMA BRACKET...     3.0                 │
│   SEQUENCED BY...  (T) PROCESS DATES       │
│   USING...         (T) DATE RANGE          │
│     - STARTING...  (E) Jan 1, 1987         │
│     - ENDING...    (E) TODAY               │
│   DATA PTS. ARE... (T) INDIVIDUAL RDNGS.   │
└────────────────────────────────────────────┘
```

| Option | | | | Printout | Update | | Folder Select |
|---|---|---|---|---|---|---|---|

TABLE 14

```
┌─Trend Scaling─────────────────────────────┐
│   TITLE...  │PLATINUM SILICIDE TEST CASE 42│
│                                            │
│   PLOT LIMITS...    (T)  USER DEFINED      │
│          - MIN...        2700.0            │
│          - MAX...        3700.0            │
│   MEAN - TARGET...       3200.0            │
│        - WARNING...      160.00  5.000%    │
│        - SPEC...         320.00  10.000%   │
│   STDV - WARNING...      1.000%            │
│        - SPEC...         2.000%            │
│   CORRELATION...         NONE              │
│   UNITS...               OHM/SQUARE        │
└────────────────────────────────────────────┘
```

| Option | | | | Printout | Update | | Folder Select |
|---|---|---|---|---|---|---|---|

TABLE 15

SQC Charts

```
┌─SQC Set-Up────────────────────────────────┐
│   TITLE...  │PLATINUM SILICIDE TEST CASE 42│
│                                            │
│   PLOT...           (T) WAFER MEAN         │
│   IN GROUPS OF...   (T) 3                  │
│   SEQUENCED BY...   (T) PROCESS DATES      │
│   USING...          (T) DATE RANGE         │
│     - STARTING...   (E) Jan 01, 1987       │
│     - ENDING...     (E) TODAY              │
│   LIMITS ARE FOR... (T) DIFF. DATE RANGE   │
│     - STARTING...   (E) Mar 01, 1987       │
│     - ENDING...     (E) Apr 30, 1987       │
│   RULE SUBSET...    (E) FULL SET           │
└────────────────────────────────────────────┘
```

| | | | Toggle Active | | | | SQC Chart |
|---|---|---|---|---|---|---|---|

TABLE 16

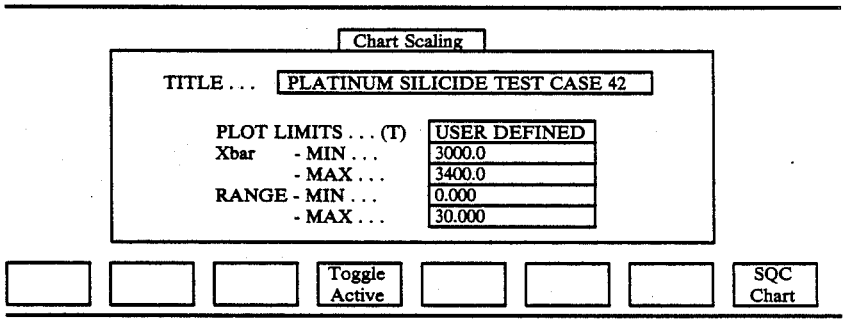

TABLE 17

| File | TOP TITLE | Sites | Mean | STDV | Date |
|---|---|---|---|---|---|
| 1049M | MAP STABILITY TEST - INTRA-LEVEL | 49 | 566 | 1.632 | 03/26/87 |
| 1050M | MAP STABILITY TEST - INTRA-LEVEL | 49 | 9223 | 0.349 | 03/26/87 |
| 1051M | MAP STABILITY TEST - INTRA-LEVEL | 49 | 9224 | 0.348 | 03/26/87 |
| 1052M | MAP STABILITY TEST - INTRA-LEVEL | 49 | 9221 | 0.351 | 03/26/87 |
| 1053M | MAP STABILITY TEST - INTRA-LEVEL | 49 | 9225 | 0.346 | 03/26/87 |
| 1054M | MAP STABILITY TEST - INTRA-LEVEL | 49 | 9220 | 0.350 | 03/26/87 |
| 1055M | MAP STABILITY TEST - INTRA-LEVEL | 49 | 9226 | 0.347 | 03/26/87 |
| 1056M | MAP STABILITY TEST - INTRA-LEVEL | 49 | 9223 | 0.348 | 03/26/87 |
| 1057M | MAP STABILITY TEST - INTRA-LEVEL | 49 | 9224 | 0.346 | 03/26/87 |

[Home] [Pg Dn] [Left] [Right] [Pg Up] [End]

Directory: Main
Total Files: 1057
Entry Number:

[Retrieve] [Mark Out Entry] [ ] [Wafer/Lot ID] [Print] [Batch Procs] [ ] [Main Menu]

Directory Listing

TABLE 17a

| File | TOP TITLE | Sites | Mean | STDV | Date |
|---|---|---|---|---|---|
| 1049M | MAP STABILITY TEST - INTRA-LEVEL | 49 | 566 | 1.632 | 03/26/87 |
| 1050M | MAP STABILITY TEST - INTRA-LEVEL | 49 | 9223 | 0.349 | 03/26/87 |
| 1051M | MAP STABILITY TEST - INTRA-LEVEL | 49 | 9224 | 0.348 | 03/26/87 |
| 1052M | MAP STABILITY TEST - INTRA-LEVEL | 49 | 9221 | 0.351 | 03/26/87 |
| 1053M | MAP STABILITY TEST - INTRA-LEVEL | 49 | 9225 | 0.346 | 03/26/87 |
| 1054M | MAP STABILITY TEST - INTRA-LEVEL | 49 | 9220 | 0.350 | 03/26/87 |
| 1055M | MAP STABILITY TEST - INTRA-LEVEL | 49 | 9226 | 0.347 | 03/26/87 |
| 1056M | MAP STABILITY TEST - INTRA-LEVEL | 49 | 9223 | 0.348 | 03/26/87 |
| 1057M | MAP STABILITY TEST - INTRA-LEVEL | 49 | 9224 | 0.346 | 03/26/87 |

[Home] [Pg Dn] [Left] [Right] [Pg Up] [End]

Directory: Main
Total Files: 1057
Entry Number:

[Select] [ ] [ ] [Folder Print] [Folder Xfer] [Host Xfer] [ ] [Main Menu]

Directory Batch Operations

TABLE 18

Data Structure for Defining One Process

| Variable Name | OP # | Format | Description |
|---|---|---|---|
| Test_Type | | int | index corresponding to test type |
| Collection_DT | | int(5) | Date and Time of data collection - automatically stored by system |
| Title | 0 | char(21) | title |
| Lot_ID | 1 | char(21) | lot identifier |

TABLE 18-continued

Data Structure for Defining One Process

| Variable Name | OP # | Format | Description |
|---|---|---|---|
| Wafer_ID | 2 | char(21) | wafer identifier |
| Process_DT | 3,4 | int(5) | date and time that wafer was processed |
| Header | 5-10 | char(6 × 21) | the six items under process time in the wafer description card (e.g., operator, equipment, shift, etc.) |
| Auto_Save | 11 | int | = 1 if data is to be automatically saved |
| Type | 12 | int | Test type |
| Sites | 13 | int(4) | number of sites, for each proc type |
| Wafer_Diameter | 14 | real | wafer diameter |
| Test_Diameter | 15 | real | diameter of measurement area |
| Sigma | 16 | real | sorting sigma - all data more than sigma*std away from the mean of all measured data is rejected as bad data points. |
| Rotat | 17,18 | int(2) | rotational position of test pattern for Diameter Scans, and Quick Tests |
| Limits | 19-23 | int(5) | Trend Chart Set-Up card target, warning, control, std warning and control limits |
| Calibrat | 24 | char(21) | name of currently selected correlation curve for mapping raw data into new values used in analysis steps. |
| Quick | 25 | char(21) | type of quick test |
| Film | 75-78 | char(6 × 21) | film name and component names - used only in film thickness measurement embodiment of invention |
| Thickness | 79-82 | real(4) | thickness of each underlying layer |
| File | | int4(4) | file number which contains thickness info |
| Interval | 27-29 | int(3) | display intervals for Contour Map, Diameter Scan and 3D interval |
| Display | 30 | int | Display option: normalized, full scale, or absolute |
| AbsVal | 31-33 | int(3) | Used in 3D charts and Diameter Scan Minimum, mean, and maximum values for clipping displayed values. |
| Display_3D | 34-35 | int(2) | rotation and tilt of 3D image |
| Current_Type | 36 | int | manual selection with pause, manual selection with autorun, autorange with pause, and autorange autorun. |
| IV | 37,38 | int(2) | Current and Voltage values used in Current Set-Up |
| MSG | 39-48 | char(10 × 21) | Memo & Notes index card |
| Trend Chart Parameters: | | | |
| SmartSigma | 52 | real | SIGMA BRACKET range (mean ± sigma*stdv) displayed for each datum on Trend Chart |
| SmartPlot | 49-51 | int(5) | (1) PLOT type: mean-std or mean-range (2) SEQUENCE BY: collection date, process date, lot & wafer id (3) USING: N days, N wafers, date range, lot range (4) POINTS: individual, day, week, month (5) PLOT LIMITS: spec limit scale, full (auto) scale, or user defined |
| TrndDate | 55-56 | int(2 × 3) | Start & End date |
| TrndCnt | 55 | int(2) | Day Count or Wafer Count |
| TrendText | 55-56 | char(2 × 21) | Start & End lot |
| PLimit | 57-58 | real(2) | Plot Min and Max for Trend Charts |
| SOC Chart Parameters: | | | |
| SQCPlot | 59-64 | int(6) | (1) type of plot: mean, range, std dev (2) group size - 2 to 10 (3) sort sequence: process dates, or collection dates (4) USING: date range, preceding N days (5) LIMITS: same date range, different date range (6) Plot Limits: 3 sigma, full, user defined |
| SQC_Date | 65-68 | int(4 × 3) | USING Start & End dates, and LIMITS Start & End dates used to find control limits |
| SQC_Limit | 69-72 | real(4) | Xbar Min and Max, Range Min and Max |
| SQC_Cnt | 73 | int | Day Count, for using preceding N days |
| Misc Parameters: | | | |
| Probe_ID | 98 | int | probe identifier - serial number |
| Probe_SP | 99 | int | probe spacing - measured in mils |
| OPTION | | int(100) | the designation, for each parameter, as (0) forced entry, (1) may change, |

TABLE 18-continued

| Variable Name | OP # | Data Structure for Defining One Process | |
|---|---|---|---|
| | | Format | Description |
| | | | (2) fixed, or (3) single forced entry |

TABLE 19
MAIN MENU

```
┌─ MENU ──────────────┐        ┌─ ITEM ──────────────────┐
│ DIRECTORY OPS       │        │ TEST SET UP             │
│ TEST DEVELOPMENT    │   *    │ QUICK TEST PATTERNS     │
│ CARTRIDGE OPS       │        │ CORRELATION CURVES      │
│ SYSTEM CONFIGURATION│        │ CAUCHY COEFFICIENTS     │
│                     │        │ SQC RULE SUBSETS        │
│                     │        │ DUPLICATE TESTS         │
│                     │        │ BATCH PRINT CNFGS       │
└─────────────────────┘        └─────────────────────────┘
```

| SELECT | | LOG ON NEW DISK | | | FOLDER SELECT | | INTRO |

TABLE 20
TEST SETUP EDIT SELECTION

```
    *CABINET                       DRAWER            FOLDER
  ┌─────────────────────┐       ┌──────────┐      ┌──────────┐
  │ SUB-COLLECTOR       │       │ TUBE 1   │      │ LOAD END │
  │ COLLECTOR           │   *   │ TUBE 2   │   *  │ MIDDLE   │
  │ COLLECTOR PLUG      │       │ TUBE 3   │      │ SOURCE   │
  │ EMITTER             │       │ TUBE 4   │      │          │
→ │ BASE                │       │          │      │          │
  │ HIGH VALUE RESISTOR │       │          │      │          │
  │ EPI                 │       │          │      │          │
  │ SPUTTERED ALUMINUM  │       │          │      │          │
  │ PLATINUM SILICIDE   │       │          │      │          │
  └─────────────────────┘       └──────────┘      └──────────┘
```

| SELECT | COLLECT OFF | COMBINE ON | OPTION | UPDATE | | | MAIN MENU |

TABLE 21

```
                    ┌ Film Type ┐
  TITLE ... │ Test of Poly dep system │
  FILM TYPE ... (E/T)  │ Poly-on-oxide │
  LAYER 1 - FILM ...   POLYSILICON
  LAYER 2 - FLIM ...   OXIDE
          - THKNS ...  │ 3200 Angstroms │
  LAYER 3 - FILM ...   —
          - THKNS ...  —
  LAYER 4 - FILM ...   —
          - THKNS ...  —
  SUBSTRATE ...        SILICON
```

TABLE 22
MASK DEFINITION FILE

| Parameter | Format | Comment |
|---|---|---|
| Mask ID | char(16) | |
| Mask Title | char(50) | |
| Probe Card type | int(1) | |
| Probe Card title | char(16) | |
| Database version | int(1) | |
| # Layers | int(1) | number of conductive layers |
| Layer Titles | char(16 × # Layers) | film layer names |
| PMX | int(100) | mapping between probe card pin and tester lines |
| Chip size | real(2) | |
| Chip spacing | real(2) | center to center distance |
| Chip origin | real(2) | distance from chip center to user origin |
| # Modules | int(1) | number of modules in chip |

TABLE 22-continued
MASK DEFINITION FILE

| Parameter | Format | Comment |
| --- | --- | --- |
| Repeat for every Module: | | |
| Module Title | char(40) | |
| Must Test | int(1) | 1 = must test, not deselectable<br>0 = may test, deselectable |
| X,Y address | real(2) | distance from chip origin to center of this module |
| # Structures | int(1) | number of structures in this module |
| Detailed Structure Definitions for each structure in this module Example: | | |
| Structure Type | char(1) | index into set of predefined set of test structures |
| Layer #s | | list of layers on which the structure is located |
| struc params | real(4) | additional values which define this particular structure (e.g. the expected or nominal width of line to be measured) |
| Pin Numbers | int(4) | list of probe card pins used by this structure |

TABLE 23
STRUCTURE OF DATA FILE DIRECTORY

File Identifier
Pointer to Smart Chart File
Repeat for every Test Data File:
Pointer to Test Data File
Lot ID
Wafer ID
Process Date
Collection Date
Other Process Parameter Values

What is claimed is:

1. In a method of using a programmed digital computer to control the measurement, storage and analysis of a multiplicity of measurements, said computer having data storage means for storing measurement data, and means for controlling the operation of an apparatus coupled to said computer, said apparatus including means for performing a multiplicity of measurements and communicating the resulting measurement values to said computer, the steps of:

establishing a set of processes which can be run under the control of said computer, each process having a predefined set of process parameters which control the operation of said apparatus;

establishing a multiplicity of process definition data structures, including a measurement definition data structure within each process definition data structure;

establishing a set up program for interactively performing the steps of:

selecting one of said processes;

defining for said selected process, a subset of the measurements which said apparatus can perform, and storing a representation of the selected subset in said measurement definition data structure for said selection process; wherein said set up program includes means for defining different subsets of measurements for each selected process; and establishing an operator process control program for enabling interactive computer controlled performance of the steps of:

selecting one of said processes;

running said selected process, and storing the measurement values conveyed by the apparatus to said computer in said data storage means;

wherein said processes each include means for accessing the corresponding measurement definition data structure and for controlling the operation of the apparatus so that only the measurements specified in said measurement definition data structure are performed and so that only the measurement values corresponding to the measurements specified in said measurement definition data structure are stored in said data storage means.

2. The method of claim 1, wherein
said defining step in said set up program includes the steps of:

defining a plurality of trend chart definitions for said selected process, each said trend chart definition including a specification of a quantity to be tracked, wherein said quantity is a predefined function of at least one of said measurements which said apparatus can perform;

and storing in said measurement definition data structure for said selected process a representation of all of the measurements included in said trend chart definitions;

said method further including the step of displaying a trend chart depicting a sequence of data points, each data point representing a predefined function of at least one of said measurements stored in said data storage means in accordance with a specified one of said trend chart definitions;

whereby only the measurements specified in said trend chart definitions for said selected process are performed and only the measurement values corresponding to the measurements specified in said trend chart definitions are stored in said data storage means.

3. The method of claim 1, wherein
said defining step in said set up program includes the steps of:

defining a plurality of analysis tasks for said selected process, including denoting in an analysis definition data structure a predefined analysis task to be performed and a specification of a quantity to be analyzed, wherein said quantity is a predefined function of at least one of said measurements which said apparatus can perform;

and storing a representation in said measurement definition data structure for said selected process a representation of all of the measurements included in said analysis definition structures;

said operator process control program includes means for enabling interactive computer controlled performance of the steps of:

selecting one of said analysis tasks for said selected process, and automatically, in response to said selection, performing the corresponding analysis task as denoted in the corresponding analysis definition data structure.

4. In a method of using a programmed digital computer to control the measurement, storage and analysis of a multiplicity of measurements, said computer having data storage means for storing measurement data, and means for controlling the operation of an apparatus coupled to said computer, said apparatus including means for performing a multiplicity of measurements and communicating the resulting measurement values to said computer, the steps of:

defining a test data structure which denotes a set of measurements that can be performed by said apparatus; said test data structure denoting a hierarchy of said set of measurements in which said measurements are divided into a multiplicity of groups of said measurements, and a plurality of said groups of measurements include a plurality of subgroups of said measurements;

establishing a multiplicity of measurement definition data structures;

denoting in each said measurement definition data structure a hierarchically arranged mask corresponding to said hierarchy denoted in said test data structure, said mask denoting selected ones of said groups of said measurements denoted in said test data structure, and selected ones of said subgroups of said measurements;

selecting one of said measurement definition data structures;

performing the set of measurements denoted by said selected measurement definition data structure, said performing step including the step of performing only those groups and subgroups of measurements denoted as selected by said selected measurement definition data structure; and storing measurement values conveyed by said apparatus to said computer in said data storage means;

wherein only measurement values corresponding to the measurements specified in said measurement definition data structure are stored in said data storage means.

5. The method of claim 4, wherein
said denoting step includes the steps of:
defining a plurality of trend chart definitions, each said trend chart definition including a specification of a quantity to be tracked, wherein said quantity is a predefined function of at least one of said measurements denoted in said test data structure;

and storing in said measurement definition data structure a mask denoting only the measurements included in said trend chart definitions;

said method further including the step of displaying a trend chart depicting a sequence of data points, each data point representing a predefined function of at least one of said measurements stored in said data storage means in accordance with a specified one of said trend chart definitions;

whereby only the measurements specified in said trend chart definitions are performed and only the measurement values corresponding to the measurements specified in said trend chart definitions are stored in said data storage means.

6. The method of claim 4, wherein
said denoting step includes the steps of:
defining a plurality of trend chart definitions, each said trend chart definition including a specification of a quantity to be tracked, wherein said quantity is a predefined function of at least one of said measurements denoted in said test data structure;

and storing in said measurement definition data structure a mask denoting the measurements included in said trend chart definitions;

said method further including the step of displaying a trend chart depicting a sequence of data points, each data point representing a predefined function of at least one of said measurements stored in said data storage means in accordance with a specified one of said trend chart definitions;

whereby the measurements specified in said trend chart definitions are performed and the measurement values corresponding to the measurements specified in said trend chart definitions are stored in said data storage means.

7. The method of claim 4, wherein
said denoting step includes the steps of:
defining a plurality of measurement analysis tasks, including denoting in each of a plurality of analysis definition data structures a measurement analysis task to be performed and a specification of a quantity to be analyzed, wherein said quantity is a predefined function of at least one of said measurements denoted in said test data structure;

and storing in said measurement definition data structure a mask denoting the measurements included in said analysis definition data structures;

said method further including the step of enabling interactive computer controlled performance of the steps of:

selecting one of said measurement analysis tasks for a selected one of said measurement definition data structures, and automatically, in response said selection, performing the corresponding measurement analysis task, as denoted in the corresponding analysis definition data structure, on measurements values stored in said data storage means.

8. In a method of using a programmed digital computer to control the measurement, storage and analysis of a multiplicity of measurements, said computer having data storage means for storing measurement data, and means for controlling the operation of an apparatus coupled to said computer, said apparatus including means for performing a multiplicity of measurements and communicating the resulting measurement values to said computer, the steps of:

defining a test data structure which denotes a set of measurements that can be performed by said apparatus; said test data structure denoting a hierarchy of said set of measurements in which said measurements are divided into a multiplicity of groups of said measurements, and a plurality of said groups of measurements include a plurality of subgroups of said measurements;

establishing a multiplicity of measurement definition data structure;

denoting in each said measurement definition data structure a hierarchically arranged mask corresponding to said hierarchy denoted in said test data structure, said mask denoting selected ones of said groups of said measurements denoted in said test data structure, selected ones of said subgroups of said measurements, and selected ones of said individual measurements;

selecting one of said measurement definition data structures;

performing the set of measurements denoted by said selected measurement definition data structure, said performing step including the step of performing only those groups of measurements denoted as selected by said selected measurement definition data structure, performing only those subgroups of measurements which correspond to selected groups of measurements and which are denoted as selected by said selected measurement definition data structure, and performing only those individual measurements which correspond to selected groups and subgroups of measurements and which are denoted as selected by said selected measurement definition data structure; and storing measurement values conveyed by said apparatus to said computer in said data storage means;

wherein only measurement values corresponding to the measurements specified in said measurement definition data structure are stored in said data storage means.

9. The method of claim 8, wherein said denoting step includes the steps of:

defining a plurality of trend chart definitions, each said trend chart definition including a specification of a quantity to be tracked, wherein said quantity is a predefined function of at least one of said measurements denoted in said test data structure;

and storing in said measurement definition data structure a mask denoting only the measurements included in said trend chart definitions;

said method further including the step of displaying a trend chart depicting a sequence of data points, each data point representing a predefined function of at least one of said measurements stored in said data storage means in accordance with a specified one of said trend chart definitions;

whereby only the measurements specified in said trend chart definitions are performed and only the measurement values corresponding to the measurements specified in said trend chart definitions are stored in said data storage means.

10. The method of claim 8, wherein said denoting step includes the steps of:

defining a plurality of trend chart definitions, each said trend chart definition including a specification of a quantity to be tracked, wherein said quantity is a predefined function of at least one of said measurements denoted in said test data structure;

and storing in said measurement definition data structure a mask denoting the measurements included in said trend chart definitions;

said method further including the step of displaying a trend chart depicting a sequence of data points, each data point representing a predefined function of at least one of said measurements stored in said data storage means in accordance with a specified one of said trend chart definitions;

whereby the measurements specified in said trend chart definitions are performed and the measurement values corresponding to the measurements specified in said trend chart definitions are stored in said data storage means.

11. The method of claim 8, wherein said denoting step includes the steps of:

defining a plurality of measurement analysis tasks, including denoting in each of a plurality of analysis definition data structures a measurement analysis task to be performed and a specification of a quantity to be analyzed, wherein said quantity is a predefined function of at least one of said measurements denoted in said test data structure;

and storing in said measurement definition data structure a mask denoting the measurements included in said analysis definition data structures;

said method further including the step of enabling interactive computer controlled performance of the steps of:

selecting one of said measurement analysis tasks for a selected one of said measurement definition data structures, and automatically, in response to said selection, performing the corresponding measurement analysis task, as denoted in the corresponding analysis definition data structure, on measurements values stored in said data storage means.

12. In a method of using a programmed digital computer to control the measurement, storage and analysis of a multiplicity of measurements on semiconductor wafers, said computer having data storage means for storing measurement data, and means for controlling the operation of an apparatus coupled to said computer, said apparatus including means for performing a multiplicity of measurements on semiconductor wafers and communicating the resulting measurement values to said computer, the steps of:

defining a test data structure which denotes a set of measurements that can be performed by said apparatus on a semiconductor wafer; said test data structure denoting a hierarchy of said set of measurements in which said measurements are divided into a plurality of chips, each said chip including a plurality of modules, each said module including a plurality of said measurements;

establishing a multiplicity of measurement definition data structure;

denoting in each said measurement definition data structure a hierarchically arranged mask corresponding to said hierarchy denoted in said test data structure, said mask denoting selected ones of said chips denoted in said test data structure, and selected ones of said modules;

selecting one of said measurement definition data structure;

performing the set of measurements denoted by said selected measurement definition data structure, said performing step including the step of performing measurements only on those chips denoted as selected by said selected measurement definition data structure, and performing measurements only on those modules which correspond to selected chips and which are denoted as selected by said selected measurement definition data structure; and storing measurement values conveyed by said apparatus to said computer in said data storage means;

wherein only measurement values corresponding to the measurements specified in said measurement definition data structure are stored in said data storage means.

13. The method of claim 12, wherein said denoting step includes the steps of:

defining a plurality of trend chart definition, each said trend chart definition including a specification of a quantity to be tracked, wherein said quantity predefined function of at least one of said measurements denoted in said test data structure;

and storing in said measurement definition data structure a mask denoting only the measurements included in said trend chart definitions;

said method further including the step of displaying a trend chart depicting a sequence of data points, each data point representing a predefined function of at least one of said measurement stored in said data storage means in accordance with a specified one of said trend chart definitions;

whereby only the measurements specified in said trend chart definitions are performed and only the measurement values corresponding to the measurements specified in said trend chart definitions are stored in said data storage means.

14. The method of claim 12, wherein said denoting step includes the steps of:

defining a plurality of trend chart definitions, each said trend chart definition including a specification of a quantity to be tracked, wherein said quantity is a predefined function of at least one of said measurements denoted in said test data structure;

and storing in said measurement definition data structure a mask denoting the measurements included in said trend chart definitions;

said method further including the step of displaying g a trend chart depicting a sequence of data points, each data point representing a predefined function of at least one of said measurements stored in said data storage means in accordance with a specified one of said trend definitions;

whereby the measurements specified in said trend chart definitions are performed and the measurement values corresponding to the measurements specified in said trend chart definitions are stored in said data storage means.

15. The method of claim 12, wherein said denoting step includes the steps of:

defining a plurality of measurement analysis tasks, including denoting in each of a plurality of analysis definition data structures a predefined measurement analysis task to be performed and a specification of a quantity to be analyzed, wherein said quantity is a predefined function of at least one of said measurements denoted in said test data structure;

and storing in said measurement definition data structure a mask denoting the measurements included in said analysis definition data structures;

said method further including the step of enabling interactive computer controlled performance of the steps of:

selecting one of said measurement analysis tasks for a selected one of said measurement definition data structures, and automatically, in response to said selection, performing the corresponding measurement analysis task, as denoted in the corresponding analysis definition data structure, on measurements values stored in said data storage means.

* * * * *